(12) United States Patent
Raleigh et al.

(10) Patent No.: US 10,207,440 B2
(45) Date of Patent: Feb. 19, 2019

(54) APPARATUS AND METHOD FOR FORMATION OF MULTI-REGION ARTICLES

(71) Applicant: Cree, Inc., Durham, NC (US)

(72) Inventors: Craig Raleigh, Burlington, WI (US); Michael G. Balles, Waukesha, WI (US); Craig S. Hubertz, Delavan, WI (US); Kurt Wilcox, Libertyville, IL (US)

(73) Assignee: Cree, Inc., Durham, NC (US)

( * ) Notice: Subject to any disclaimer, the term of this patent is extended or adjusted under 35 U.S.C. 154(b) by 964 days.

(21) Appl. No.: 14/508,915

(22) Filed: Oct. 7, 2014

(65) Prior Publication Data

US 2016/0096296 A1    Apr. 7, 2016

(51) Int. Cl.
| | |
|---|---|
| *B29C 45/26* | (2006.01) |
| *B29C 45/16* | (2006.01) |
| *B29L 11/00* | (2006.01) |
| *B29C 45/27* | (2006.01) |
| *B29C 45/00* | (2006.01) |

(52) U.S. Cl.
CPC ........ *B29C 45/2681* (2013.01); *B29C 45/162* (2013.01); *B29C 45/2673* (2013.01); *B29C 45/2735* (2013.01); *B29C 2045/0027* (2013.01); *B29L 2011/0016* (2013.01)

(58) Field of Classification Search
CPC ................................................ B29C 45/2681
See application file for complete search history.

(56) References Cited

U.S. PATENT DOCUMENTS

| | | | |
|---|---|---|---|
| 4,808,101 A | 2/1989 | Schad et al. | |
| 5,223,275 A | 6/1993 | Gellert | |
| 5,494,615 A | 2/1996 | Wang Lee | |
| 5,954,423 A | 9/1999 | Logan et al. | |

(Continued)

FOREIGN PATENT DOCUMENTS

| | | |
|---|---|---|
| DE | 202014100462 | 4/2014 |
| EP | 1657758 A2 | 5/2006 |

(Continued)

OTHER PUBLICATIONS

Stricker, Michael, et al., "Focus on Precision—Injection Molding Optical Components", Translated from Kunststoffe Apr. 2009, pp. 30-34.

(Continued)

*Primary Examiner* — Larry W Thrower
(74) *Attorney, Agent, or Firm* — Jansson Munger McKinley & Kirby Ltd.

(57) ABSTRACT

An injection-molding apparatus for article formation. The injection-molding apparatus includes a single mold base supporting at least one grouping of a plurality of shape-forming configuration sets. Each set is shaped for forming one layer of a multilayered article comprising an asymmetric surface. Each set may include at least one cavity which retains each article region formed by the preceding injection-molding shot(s). The single mold base includes an internal movable part which moves within the single mold base with respect to a stationary part such that relative positions of the shape-forming configurations are advanced for each set to form a subsequent article region in the cavities. Each subsequent shot may be prior to full cooling of the article region formed in the previous shot.

29 Claims, 25 Drawing Sheets

(56) References Cited

U.S. PATENT DOCUMENTS

| | | |
|---|---|---|
| 6,123,889 A | 9/2000 | Katagiri |
| 6,395,201 B1 | 5/2002 | Hunt et al. |
| 6,499,870 B1 | 12/2002 | Zwick et al. |
| 6,502,956 B1 | 1/2003 | Wu |
| 6,606,199 B2 | 8/2003 | Wang |
| 6,636,363 B2 | 10/2003 | Kaminsky et al. |
| 6,679,621 B2 | 1/2004 | West et al. |
| 6,896,381 B2 | 5/2005 | Benitez et al. |
| 6,942,360 B2 | 9/2005 | Chou et al. |
| 7,056,567 B2 | 6/2006 | O'Neill et al. |
| 7,152,985 B2 | 12/2006 | Benitez |
| 7,283,313 B2 | 10/2007 | Tamaoki |
| 7,682,533 B2 | 3/2010 | Iatan |
| 7,682,853 B2 | 3/2010 | Ashida |
| 7,696,527 B2 | 4/2010 | Uemoto |
| 7,722,196 B2 | 5/2010 | Caire et al. |
| 7,724,321 B2 | 5/2010 | Hsieh et al. |
| 7,736,019 B2 | 6/2010 | Shimada et al. |
| 7,918,590 B1 | 4/2011 | Li et al. |
| 8,215,814 B2 | 7/2012 | Marcoux |
| 8,235,547 B2 | 8/2012 | Hofmann |
| 8,292,482 B2 | 10/2012 | Harbers et al. |
| 8,330,176 B2 | 12/2012 | Thompson et al. |
| 8,348,461 B2 | 1/2013 | Wilcox et al. |
| 8,434,912 B2 | 5/2013 | Holder |
| 8,459,848 B2 | 6/2013 | Marley |
| 8,545,049 B2 | 10/2013 | Davis et al. |
| 8,602,605 B2 | 12/2013 | Park et al. |
| 8,820,963 B2 | 9/2014 | Quilici et al. |
| 8,891,171 B2 | 11/2014 | Choquet |
| 8,899,786 B1 | 12/2014 | Moghal et al. |
| 2004/0161490 A1 | 8/2004 | Babin et al. |
| 2005/0168987 A1 | 8/2005 | Tamaoki et al. |
| 2005/0231812 A1 | 10/2005 | Leu et al. |
| 2008/0079182 A1 | 4/2008 | Thompson et al. |
| 2008/0151550 A1 | 6/2008 | Liu et al. |
| 2008/0198604 A1 | 8/2008 | Kim et al. |
| 2008/0285136 A1 | 11/2008 | Jacobowitz et al. |
| 2008/0298056 A1 | 12/2008 | Petersen |
| 2009/0159915 A1 | 6/2009 | Branchevsky |
| 2010/0002449 A1 | 1/2010 | Lin |
| 2010/0163909 A1 | 7/2010 | Chen et al. |
| 2010/0207140 A1 | 8/2010 | Rudaz et al. |
| 2010/0271708 A1 | 10/2010 | Wilcox |
| 2011/0063857 A1 | 3/2011 | Li et al. |
| 2011/0176301 A1 | 7/2011 | Liang et al. |
| 2012/0003343 A1 | 1/2012 | Armstrong et al. |
| 2012/0014115 A1 | 1/2012 | Park et al. |
| 2012/0091487 A1 | 4/2012 | Chan et al. |
| 2012/0170280 A1 | 7/2012 | Choquet |
| 2012/0281404 A1 | 11/2012 | Wilcox et al. |
| 2012/0294011 A1 | 11/2012 | Cattoni et al. |
| 2012/0307495 A1 | 12/2012 | Shih |
| 2012/0319592 A1 | 12/2012 | Riesebosch |
| 2013/0148363 A1 | 6/2013 | Choquet et al. |
| 2014/0126206 A1 | 5/2014 | Wilcox et al. |
| 2014/0268810 A1 | 9/2014 | Marquardt |

FOREIGN PATENT DOCUMENTS

| | | |
|---|---|---|
| JP | H0319818 | 1/1991 |
| JP | H03138147 | 6/1991 |
| JP | H03142207 | 6/1991 |
| JP | 2001191365 A | 7/2001 |
| WO | 08/076399 | 6/2008 |
| WO | 10/095068 | 8/2010 |
| WO | 11/091529 | 8/2011 |
| WO | 2012132597 A1 | 10/2012 |
| WO | 2012147342 A1 | 11/2012 |

OTHER PUBLICATIONS

English Language Abstract of JP H0319818, Tatsu, Jan. 29, 1991.
English Language Abstract of DE 202014100462, Grunecker et al., Apr. 10, 2014.
English Language Abstract of JP H03138147, Akihiro et al., Jun. 12, 1991.
English Language Abstract of JP H03142207, Hiroshi et al., Jun. 19, 1991.

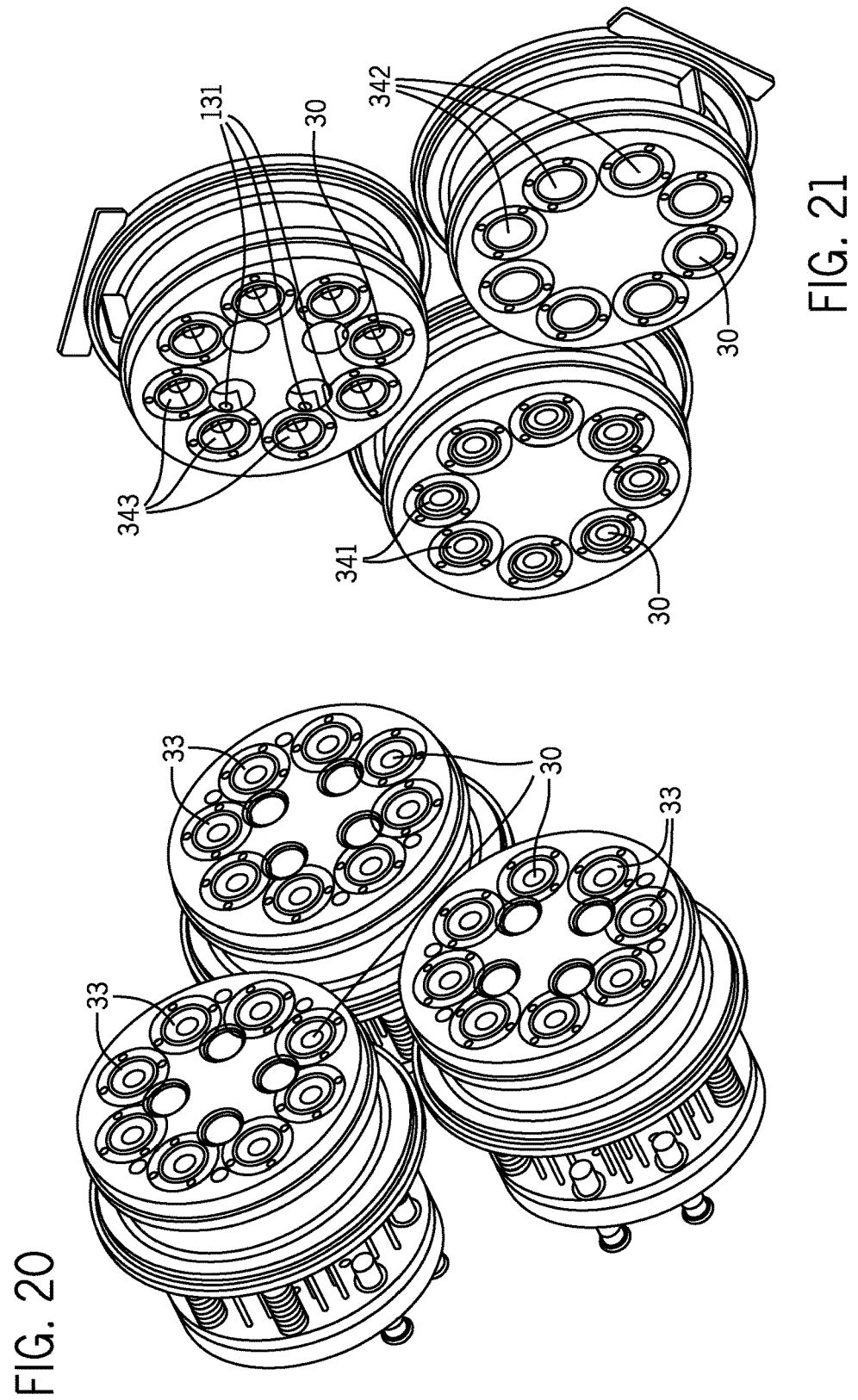

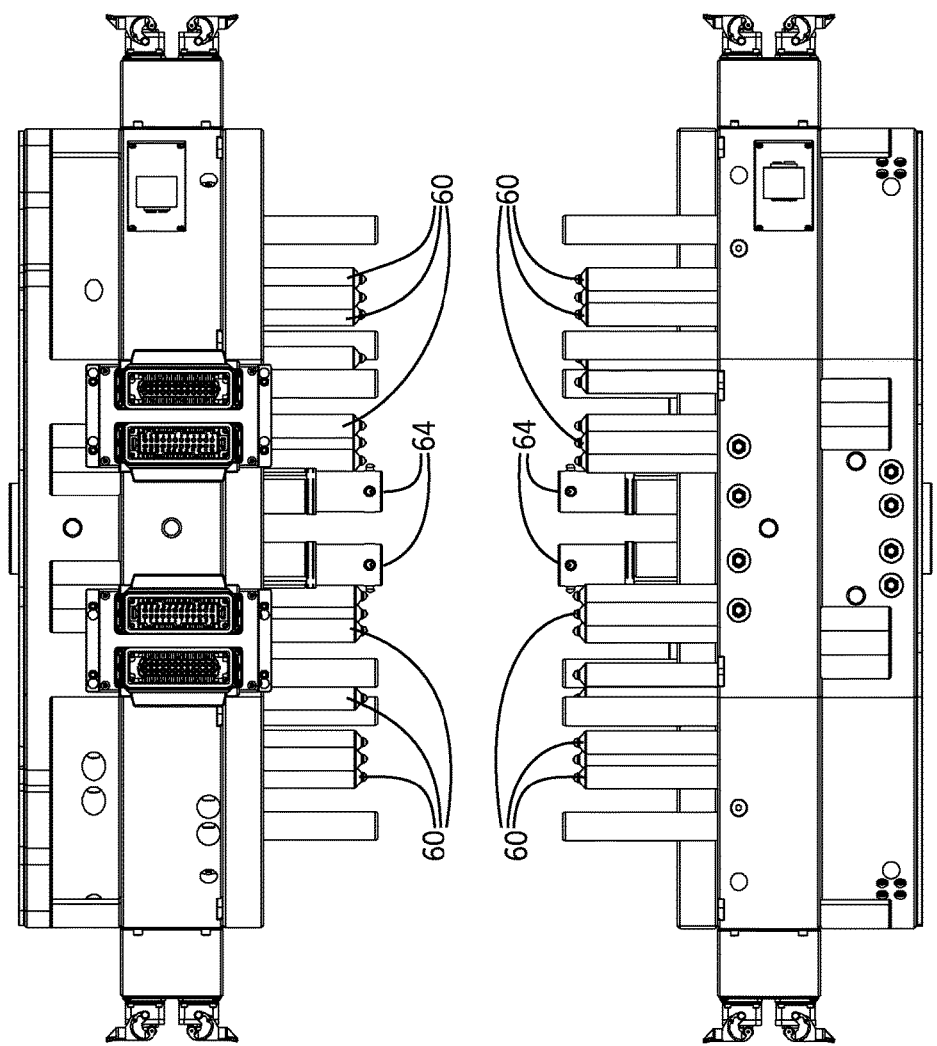

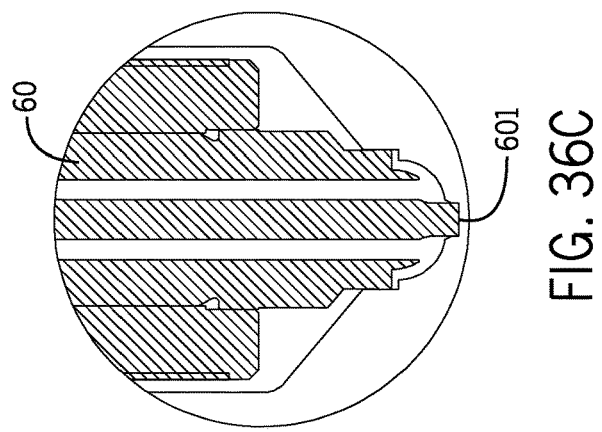
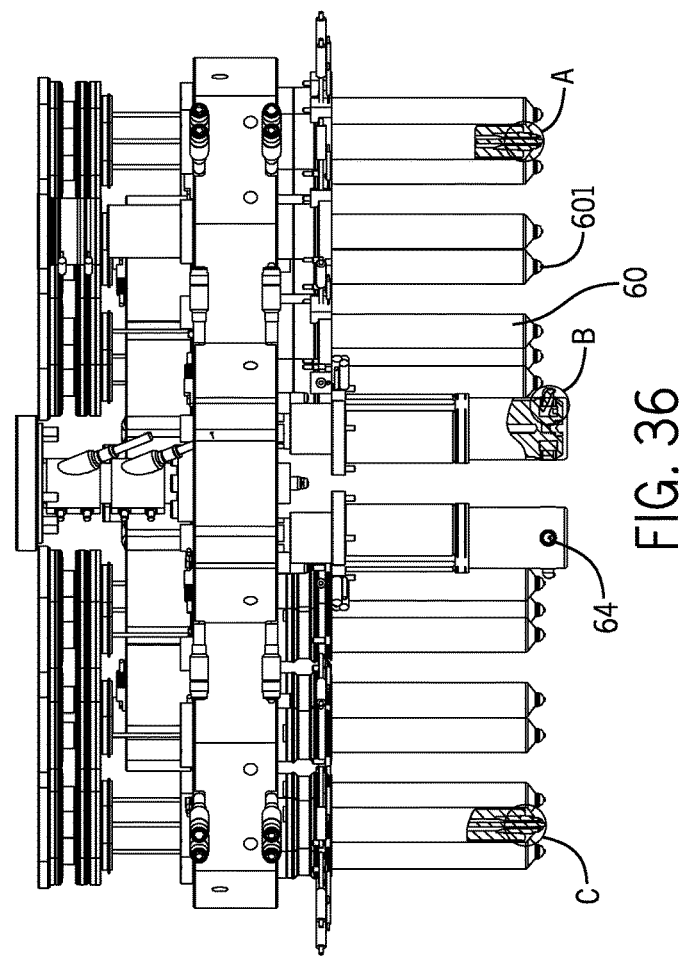

APPARATUS AND METHOD FOR FORMATION OF MULTI-REGION ARTICLES

FIELD OF THE INVENTION

This invention relates to apparatus for molding complex-shaped articles such as lenses for directing light from light sources such as LED (light emitting diode), and, still more particularly, to methods for manufacturing such lenses.

BACKGROUND OF THE INVENTION

In recent years, the use of light-emitting diodes (LEDs) in development of light fixtures for various common lighting purposes has increased, and this trend has accelerated as advances have been made in the field. Indeed, lighting applications which previously had typically been served by fixtures using what are known as high-intensity discharge (HID) lamps are now being served by LED light fixtures. Such lighting applications include, among a good many others, roadway lighting, factory lighting, parking lot lighting, and commercial building lighting.

There has been a continuous effort made to develop LED lenses for directing LED light into a desired light distribution. Some of such lenses are difficult and expensive to manufacture, which increases overall cost for LED lighting using such lenses. LED lenses often have a large difference between the thickness of the lens along the light-emission axis and the thickness of the lens along its peripheral edges.

Such lenses have been manufactured by using various multi-layer injection molding processes. FIG. 43 illustrates one example of present technology for such processes which utilizes multiple injection units, multiple mold halves, and mechanical transfer of mold components by moving the entire core side of the mold to the next cavity for the next shot. Such multi-layer injection molding requires the use of expensive rotary platens or shuttle systems along with multiple core halves to build up the molded component in layers.

Current systems for the multi-step injection molding process also require parts to be demolded and cooled before being replaced into a cavity for the subsequent shot. Such methods require addition of certain features on the plastic component to facilitate location indexing of the parts in the mold for proper alignment. These added features increase tooling costs and material consumption.

It is desirable to minimize the capital cost of the equipment used in multilayer injection molding, as well as to maximize floor space usage in manufacturing facilities.

SUMMARY OF THE INVENTION

The present invention relates to an improved apparatus and method for forming thick-walled lenses from a suitable thermoplastic material. One aspect of the present invention is an injection-molding apparatus for article formation. In certain embodiments, the injection-molding apparatus includes a single mold base supporting at least one grouping of a plurality of shape-forming configuration sets. Each set includes at least one cavity and is shaped for forming one of first-formed, intermediate-formed and last-formed regions of the article in the cavities by a corresponding one of injection-molding shots. Each cavity retains each article region formed by the preceding injection-molding shot(s).

The single mold base includes a movable part which moves internally within the single mold base with respect to a stationary part such that relative positions of the shape-forming configurations are advanced for each set to form a subsequent article region in the cavities.

In some embodiments, the movable part is rotatable about an axis defined by the single mold base. The cavities may be supported and rotated by the movable part for their advancement to form subsequent article regions in each cavity. It should be understood that during continuous production cycles, the first-formed region may be subsequent to the last-formed.

In certain embodiments, all of the cavities supported by the movable part are identical. In such embodiments, for the number of the cavities supported by the movable part, the stationary part supports the same number of shape-forming configurations each of which is shaped according to a corresponding one of the plurality of the article regions to be sequentially formed in each cavity.

In some versions, the plurality of shape-forming configuration sets includes at least three sets.

In certain embodiment, each shape-forming configuration set may be a pair of shape-forming configurations. Of each pair, the shape-forming configurations supported by the stationary part may be cavities each shaped for forming one of the article regions.

The shape-forming configuration sets may be configured such that each subsequent injection-molding shot at least partially over-molds the article region formed in the preceding shot. The injection-molding apparatus may be configured such that each subsequent shot is prior to full cooling of the article region formed in the previous shot.

In certain embodiments, the shape-forming configurations are shaped such that each of the article regions formed in a corresponding one of the injection-molding shots includes at least a portion of one of final surfaces of the article.

In some embodiments, the injection-molding apparatus further includes a hot monifold operatively connected to the single mold base.

The injection-molding apparatus may include at least two barrels delivering injection-molding shots to the single mold base. One of the at least two barrels may be operatively connected to the shape-forming configuration set(s) for forming the last-formed article region. In certain of such embodiments, another of the at least two barrels is operatively connected to the shape-forming configuration set(s) for forming article regions prior to the last-formed.

The barrel for the last-formed article region may deliver the corresponding injection-molding shot at a higher pressure than the injection-molding shots delivered by the other of the at least two barrels.

In certain embodiments, the injection-molding apparatus includes at least one grouping of a plurality of nozzles each for delivering a corresponding injection-molding shot forming one of the article regions. One of the nozzles may be for forming the last-formed article region. Such nozzle may be positioned for delivering the corresponding injection-molding shot at a lateral edge of the finished article. The other nozzles may be for forming article regions prior to the last-formed. Such nozzles may each be positioned for delivering a corresponding injection-molding shot at such position which is over-molded with at least one of the subsequently-formed article regions.

In certain embodiments of the injection-molding apparatus according to the present invention, one of the movable and stationary parts supports identical shape-forming configurations, each for one of the shape-forming configuration sets. In such embodiments, the other of the movable and stationary parts supports shape-forming configurations each shaped for forming one of the article regions and each corresponding to one of the shape-forming configuration sets. The movable part moves with respect to the stationary part for delivering injection-molding shots to each cavity for sequential formation of the article regions.

In some embodiments, the movable part supports the cavities which retain the regions of the article formed by the preceding injection-molding shot(s).

Both shape-forming configurations of each pair may be cavities.

The shape-forming configuration sets may be shaped for each article region to be at least partially over-molded with at least one of the subsequently-formed regions of the article.

During each of the injection-molding shots, the movable part is in contact with the stationary part such that shape-forming configuration of each pair are in alignment. Between the injection-molding shots, the movable part may be spaced from the stationary part.

The article may be a lens member for transmitting LED light therethrough. In certain embodiments, the lens member includes a lens portion and a flange thereabout, the lens portion having inner and outer surfaces. The shape-forming configurations may be shaped such that each lens region formed in one of the injection-molding shots includes at least a portion of one of the inner and outer surfaces of the lens member.

Some embodiments of the injection-molding apparatus include at least one grouping of the nozzles each for delivering a corresponding injection-molding shot forming one of the first-formed region, intermediate-formed region(s) and last-formed region of the lens member.

One of the nozzles may be for forming the last-formed lens region. Such nozzle may be positioned for delivering the corresponding injection-molding shot at an edge of the lens member. This may eliminate the need for internal degating of the finished product. Such last injection-molding shot may be delivered at an angle between vertical and horizontal.

The other of the nozzles may be for forming lens regions prior to the last-formed. Such nozzles may each be positioned for delivering the corresponding injection-molding shot at such position which is over-molded with at least one of the subsequently-formed lens regions.

The injection-molding apparatus may be configured such that each injection-molding shot is delivered prior to full cooling of the prior-formed lens region being over-molded by such injection-molding shot.

In certain embodiments, the shape-forming configurations are shaped such that the last injection-molding shot forms the outer surface of the lens member. The shape-forming configurations may be shaped such that the last injection-molding shot forms the flange of the lens member.

Some embodiments of the injection-molding apparatus may further include an ejection system configured for engaging the flange portion to eject the lens member from the single mold base after the last injection-molding shot.

In certain embodiments, the single mold base supports a plurality of groupings each of a plurality of shape-forming configuration sets, each set including at least one cavity and being shaped for forming one of a plurality of regions of an article in the cavities by a corresponding one of injection-molding shots for simultaneous formation of a first-formed region, intermediate-formed region(s) and a last-formed region of the respective article, each cavity retaining each article region formed by the preceding injection-molding shot(s).

The plurality of the groupings may be an even number of the groupings. The injection-molding apparatus may include a valve-gate system for balancing each injection-molding shot for equal filling of the cavities to form a common one of the article regions.

The article(s) may have three or more regions. The plurality of the groupings may have eight of the grouping of at least three shape-forming configuration pairs for simultaneously forming eight of each of at least three article regions, thereby simultaneously forming a region for each of at least twenty-four articles.

Another aspect of the present invention is a method for article formation. An injection-molding apparatus may be provided. Such apparatus may have a single mold base supporting at least one grouping of a plurality of shape-forming configuration sets, each pair set including at least one cavity and being shaped according to one of a plurality of regions of an article, the single mold base comprising an internal movable part. A first-formed region of the article is formed in at least one of the cavities by delivering an injection-molding shot to the respective shape-forming configuration set. The movable part is advanced within the single base such that the cavity retaining the first-formed article region is paired with the shape-forming configuration corresponding to an intermediate-formed region of the article. The method includes the step of delivering an injection-molding shot which forms the intermediate-formed article region. The intermediate-formed article region at least partially over-molds the previously-formed article region. The movable part is further advanced within the single base such that the cavity retaining the first-formed and at least one intermediate-formed article regions is paired with the shape-forming configuration corresponding to a subsequent one of the article regions. The intermediate-formed article region is at least partially over-molded with the subsequent one of the article regions by delivering a subsequent injection-molding shot.

In certain embodiments, each injection-molding shot is delivered to a corresponding shape-forming configuration pair prior to full cooling of the article region formed in a preceding injection-molding shot.

The subsequent one of the article regions may be a last-formed article region.

The step of forming a first-formed region of the article, the step of delivering a subsequent injection-molding shot, and the step of at least partially over-molding the at least one intermediate-formed article region may be performed simultaneously each in one of the cavities.

In certain embodiments, the single mold base defines an axis. In such embodiments, in the steps of advancing and further advancing, the movable part rotates about the axis with respect to a stationary part.

The movable part may support the cavities for rotation thereof to form subsequent article regions in each cavity. All of the cavities of the movable part may be identically shaped. For the number of cavities supported by the movable part, the stationary part may support an equal number of shape-forming configurations each of which is shaped according to a corresponding one of the article regions to be sequentially formed in each cavity. Each of the regions of the article may include at least a portion of one of final surfaces of the article.

In certain embodiments, article formation may include additional steps, some of which may be performed before the injection-molting shot forming the first-formed article region. Some of such additional steps may be performed during the injection-molding process between injection-molding shots and/or after formation of the last-formed article region.

As used herein in referring to portions of the devices of this invention, the terms "upward," "upwardly," "upper," "downward," "downwardly," "lower," "upper," "top," "bottom" and other like terms assume that the light fixture is a position for downward illumination.

In descriptions of this invention, including in the claims below, the terms "comprising," "including" and "having" (each in their various forms) and the term "with" are each to be understood as being open-ended, rather than limiting, terms.

BRIEF DESCRIPTION OF THE DRAWINGS

FIG. 20 is a perspective view of a holder supported by the movable part of FIG. 18, showing the twenty-four identical cavities held as three groups of eight.

FIG. 21 is a perspective view of a holder supported by the stationary part of FIG. 19 and holding twenty-four cavities in the three groups of eight cavities, each group shaped corresponding to one of three groupings of shape-forming configurations.

FIG. 31 is a top view of the nozzle portion of the stationary part of FIG. 27.

FIG. 32 is a bottom view of the nozzle portion of the stationary part of FIG. 27.

FIG. 36 is a top view of the nozzle arrangement of FIG. 33.

FIGS. 36A-C are enlarged views of respective fragments of FIG. 36.

DETAILED DESCRIPTION OF EXEMPLARY EMBODIMENTS

Figure 2:
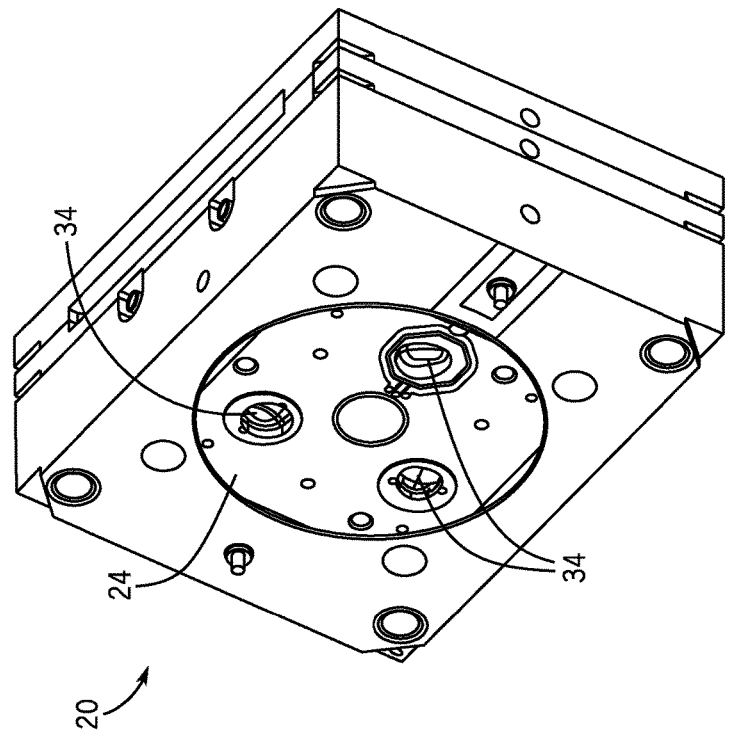
FIG. 2 is a perspective view of a portion of the single mold base with a stationary part which supports three shape-forming configurations in the form of cavities, each of which is shaped according to a corresponding one of three article regions to be sequentially formed in each cavity of FIG. 1.

The figures illustrate exemplary embodiments of injection-molding apparatuses in accordance with this invention. Common or similar parts in different embodiments are given the same numbers in the drawings; the injection-molding apparatuses themselves are often referred to by the numeral 10 followed by different letters with respect to alternative embodiments.

Figure 3:
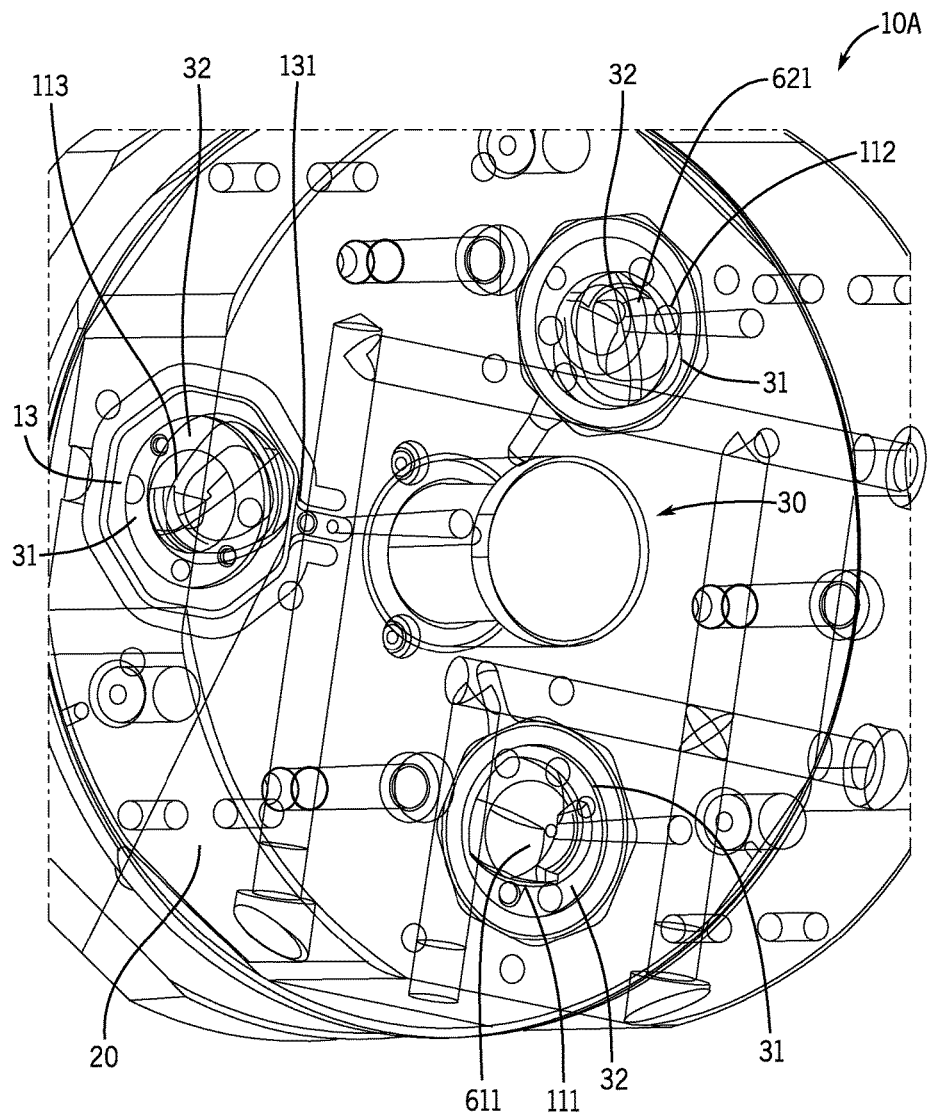
FIG. 3 is a schematic transparent view of the single mold base illustrating cavities of the movable and stationary parts of FIGS. 1 and 2 paired together and showing nozzles delivering an injection-molding shot to each of the pairs.

FIGS. 1-7 illustrate an injection-molding apparatus 10A according to one embodiment of the present invention for formation of article(s) 11. FIG. 3 best shows injection-molding apparatus 10A including a single mold base 20 supporting a grouping 30 of a plurality of shape-forming configuration sets 32. The plurality of shape-forming configuration sets includes at least three sets.

Figure 1:
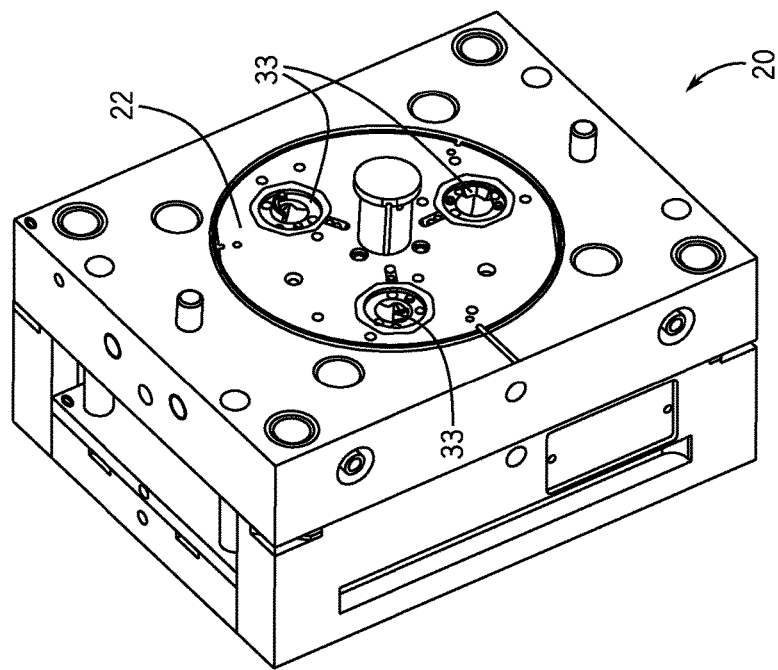
FIG. 1 is a perspective view of a portion of a single mold base supporting an internal movable part with three identical cavities.

FIGS. 1-3 further show the plurality of shape-forming configuration sets including three sets 32. FIGS. 1 and 2 show each shape-forming configuration set 32 as a pair of shape-forming configurations 31.

Each pair 32 includes a cavity 33 which retains each article region formed by the preceding injection-molding shot(s). Each pair 32 is shaped for forming by a corresponding one of injection-molding shots one of first-formed region 111, intermediate-formed region 112 and last-formed region 113 of article 11 seen in FIG. 4.

Figure 5:
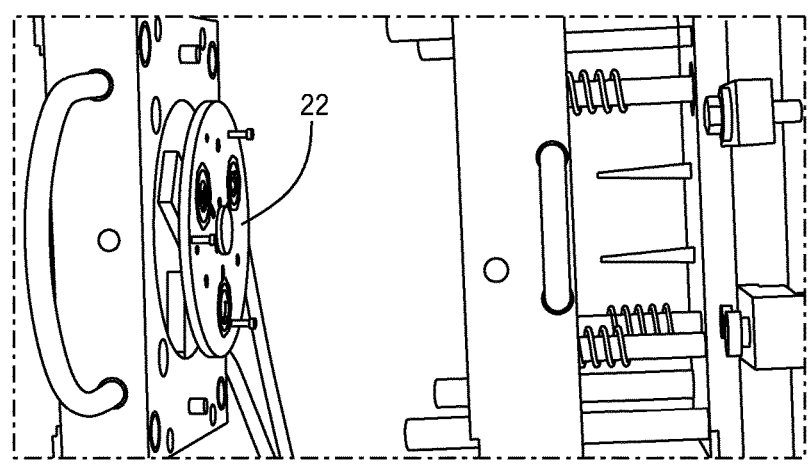
FIGS. 5 and 6 are partial views of the injection-molding apparatus of FIG. 4, showing the internal movable part being rotated for formation of subsequent lens regions in each of the cavities.
Figure 6:
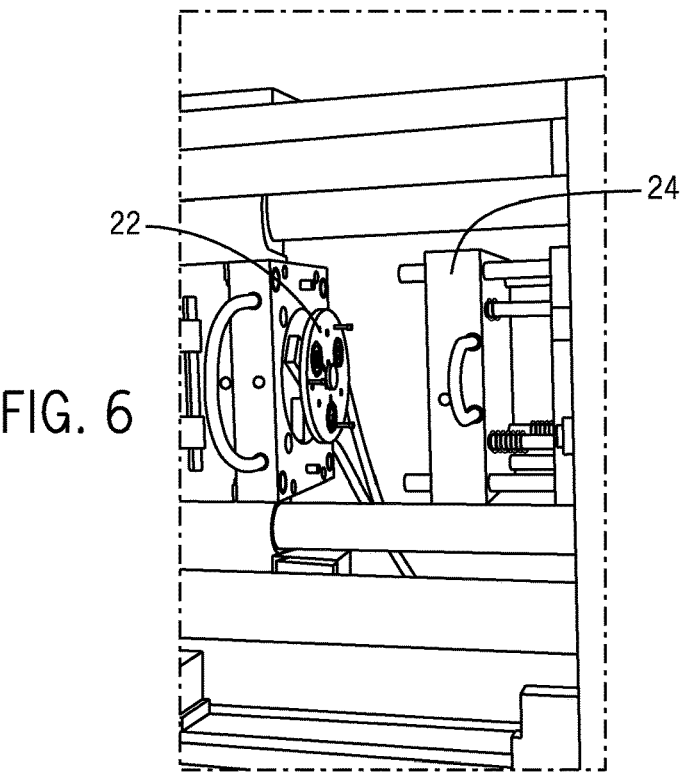
Figure 7:
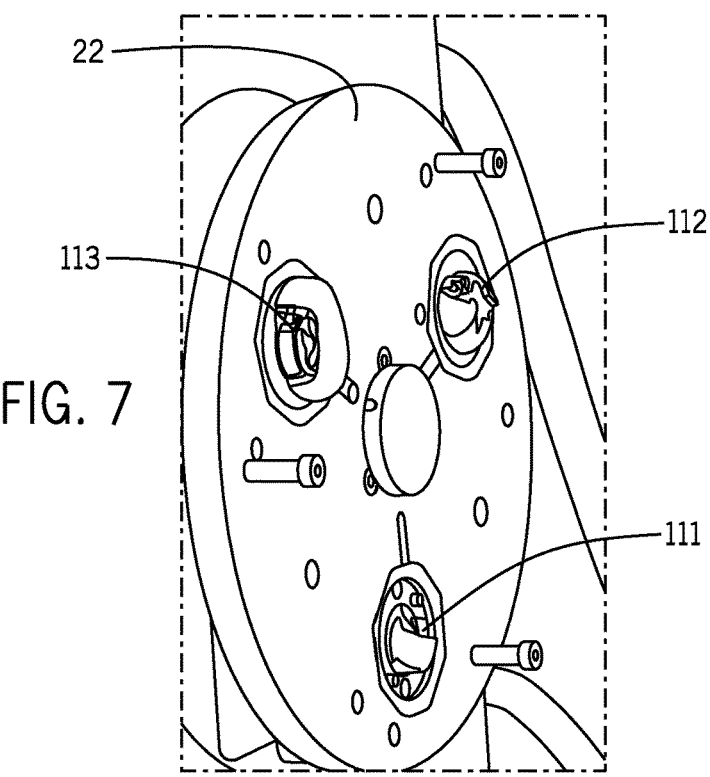
FIG. 7 is a partial view of the injection-molding apparatus as in FIGS. 1 and 2, but showing each of the three cavities retaining corresponding lens region(s) formed by the preceding injection-molding shot(s).

Single mold base 20 includes a movable part 22 which moves internally within single mold base 20 with respect to a stationary part 24 such that relative positions of the shape-forming configurations are advanced for each set to form a subsequent article region in the cavities, as illustrated in FIGS. 5-7.

Figure 22:
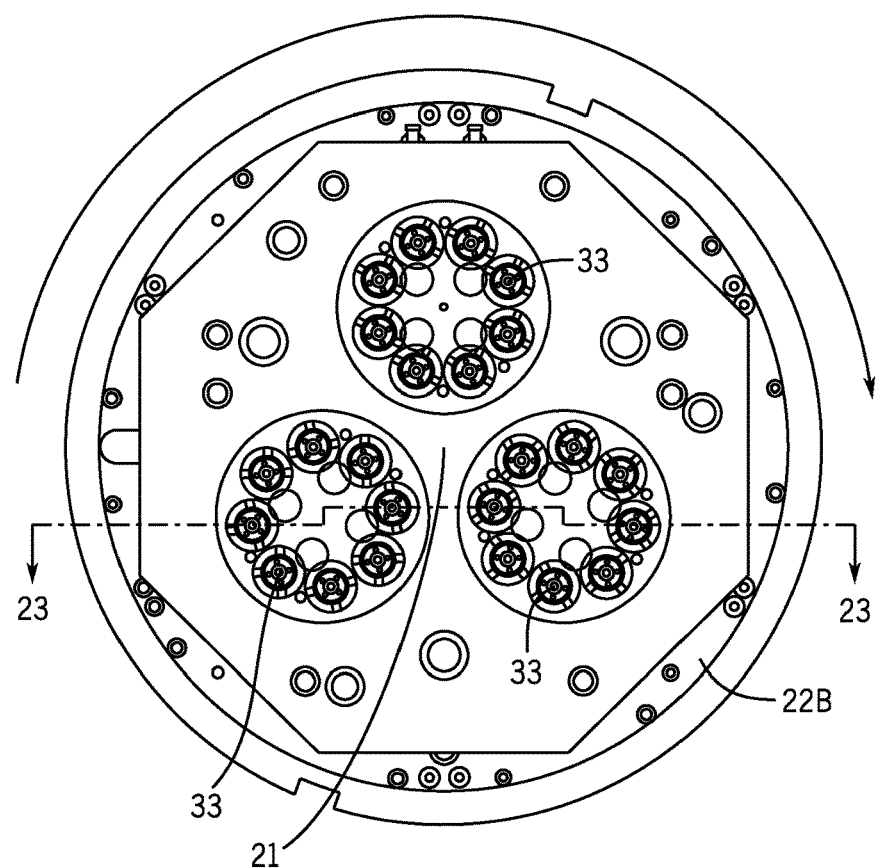
FIG. 22 is a plan view of the movable part of FIG. 18, shown from the side of the cavities.

Movable part 22 is rotatable about an axis 21 defined by single mold base 20, as seen in FIG. 22. FIGS. 1-7 show cavities 33 supported and rotated by movable part 22 for their advancement to form subsequent article regions in each cavity 33.

Figure 4:
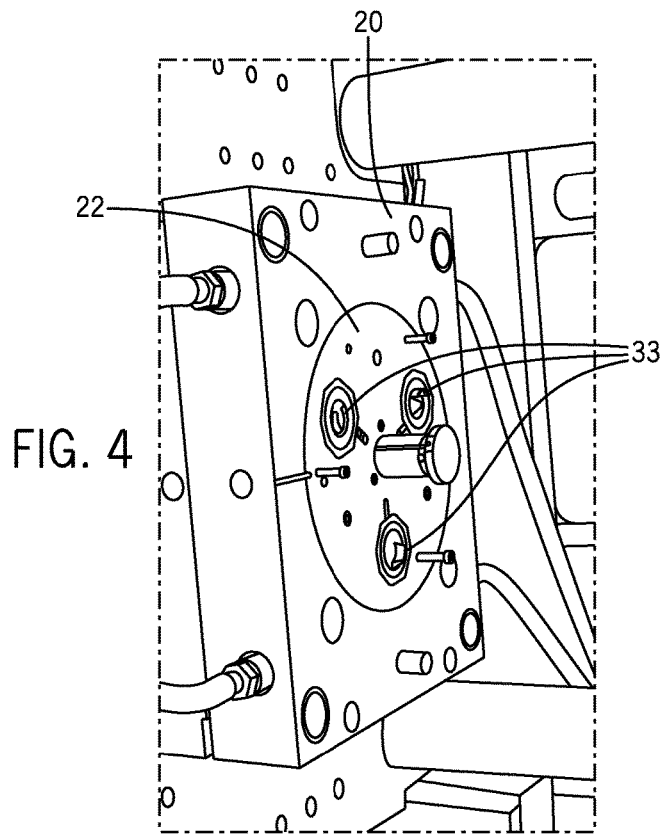
FIG. 4 is a partial view of the injection-molding apparatus according to one embodiment of the present invention, showing the internal movable part with three cavities each ready for a subsequent injection-molding shot for formation of one of the first-formed, intermediate-formed and last-formed lens regions. Two of the cavities are shown retaining corresponding lens region(s) formed by the preceding injection-molding shot(s).

FIG. 4 shows one of cavities 33 empty which occurs when finished article 11 is removed from apparatus 10 after an injection shot for last-formed article region 113. Therefore, during a continuous production process, first-formed region 111 is subsequent to last-formed article region 113.

One or more cavities may remain empty at the beginning of the production cycle when the number of performed injection shots is less than the total number of shape-forming configuration sets.

It is best seen in FIG. 1 that all cavities 33 supported by movable part 22 are identical. FIGS. 1 and 2 also show that for the number of identically-shaped cavities 33 supported by movable part 22, stationary part 24 supports the same number of shape-forming configurations 34. Each of shape-forming configurations 34 is uniquely shaped according to a corresponding one of article regions 111, 112 and 113 to be sequentially formed in each cavity 33.

Figure 8:
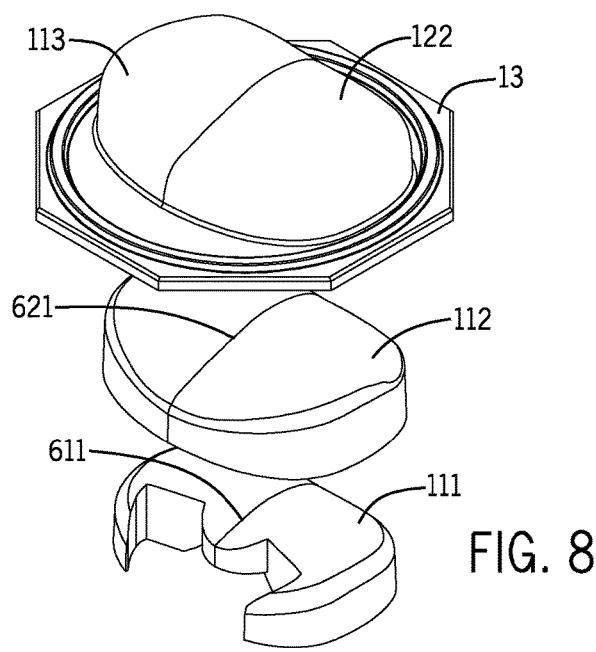
FIG. 8 is an exploded perspective view of an example of a three-layer lens formed in the single mold base of FIGS. 1-7.
Figures 9, 10:
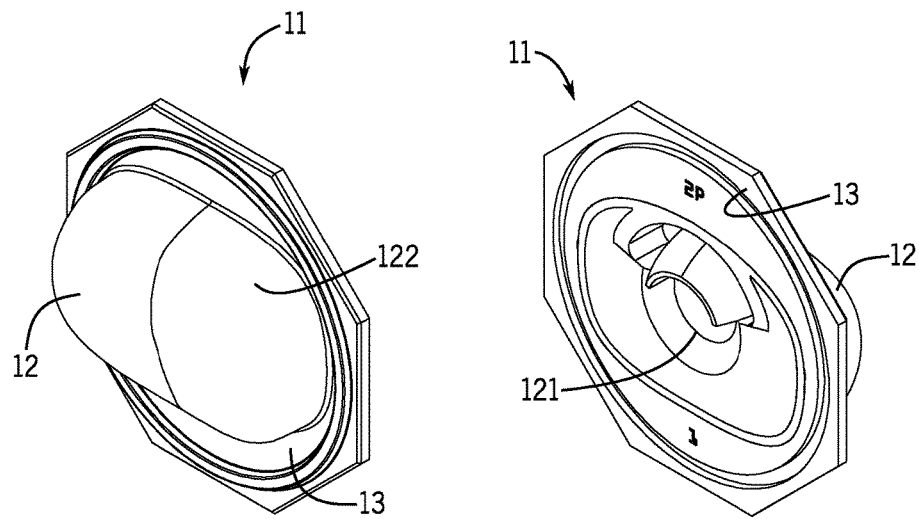
FIG. 9 is a perspective view of the three-layer polymeric lens of FIG. 8, showing its light-output side.
FIG. 10 is a perspective view of the lens of FIG. 9, but showing its light-input side.
Figure 11:
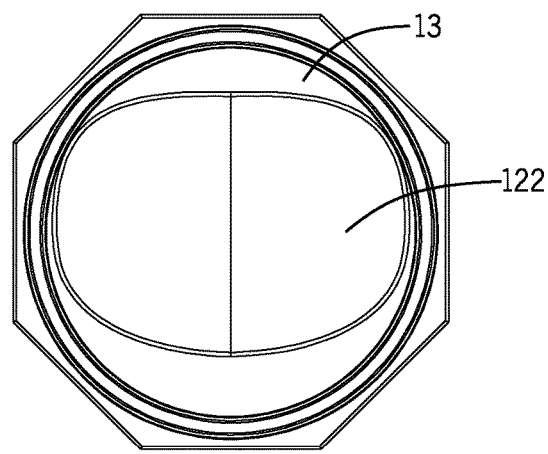
FIG. 11 is a plan view of the lens of FIG. 9, showing its light-output side.
Figure 12:
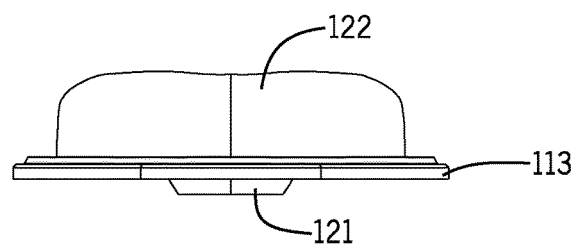
FIG. 12 is a lateral elevation of the lens of FIG. 9.
Figure 13:
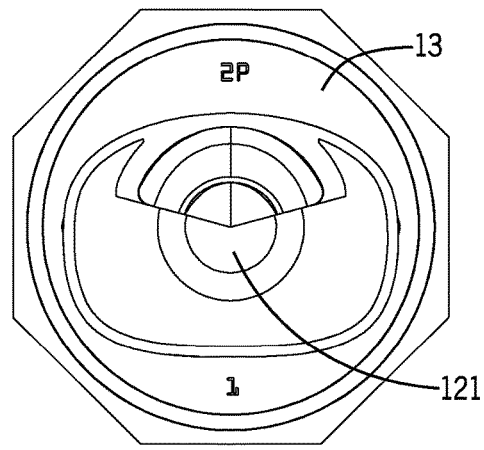
FIG. 13 is another plan view of the lens of FIG. 9, but showing its light-input side.
Figure 14:
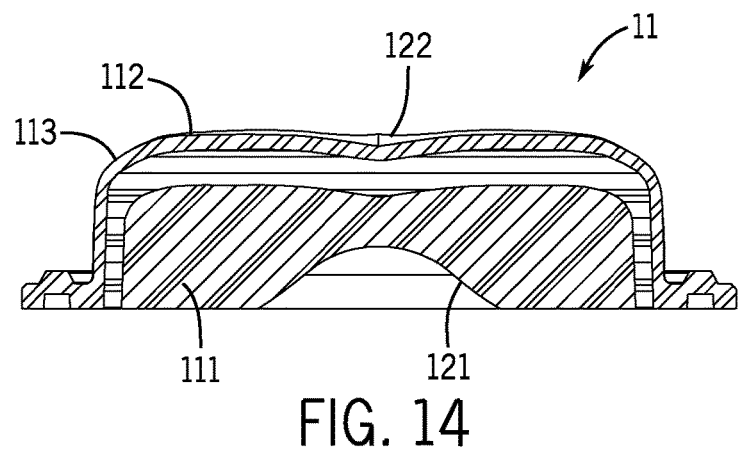
FIG. 14 is a lateral side-to-side cross-sectional view of the lens of FIG. 9, illustrating the three layers of the lens.
Figure 15:
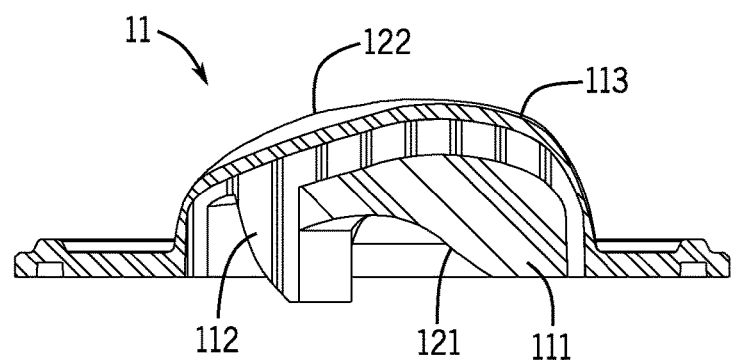
FIG. 15 is a front-to-back cross-sectional view of the lens of FIG. 9, illustrating the three layers of the lens.

FIGS. 8-15 show article 11 as a lens member for transmitting LED light therethrough. Lens member 11 includes a lens portion 12 and a flange 13 thereabout. FIGS. 9 and 10 show lens portion 12 having inner surface 121 and outer surfaces 122. As seen in FIGS. 8, 14 and 15, shape-forming configurations 31 are shaped such that each of lens regions 111, 112 and 113 formed in one of the injection-molding shots includes at least a portion of one of inner and outer surfaces 121 and 122 of lens member 12. FIGS. 14 and 15 best show that shape-forming configuration sets 32 are configured such that each subsequent injection-molding shot at least partially over-molds the article region 111 and/or 112 formed in the preceding shot.

The injection-molding apparatus may be configured such that each subsequent shot is prior to full cooling of the article region formed in the previous shot. Such overmolding of a substantially warm prior-formed article region achieves smooth substantially seamless blending of the adjacent regions together. Such seamless overmolding is highly beneficial in formation of LED lenses to facilitate accurate transmission of light therethrough.

It is best seen in FIG. 15 that shape-forming configurations 31 are shaped such that each of lens regions 111, 112 and 113 formed in a corresponding one of the injection-molding shots includes at least a portion of one of final inner and outer surfaces 121 and 122 of lens 11.

FIGS. 3, 8, 14 and 15 show that shape-forming configurations 34 are shaped such that last-formed lens region 113 includes outer surface 122 of lens member 11. Cavities 34 are also shaped such that the last injection-molding shot forms flange 13.

An ejection mechanism of injection molding apparatuses 10A and 10B is configured for engaging flange 13 to eject finished lens member 11 from single mold base 20 after the last injection-molding shot.

FIGS. 16-39 illustrate another embodiment of injection-molding apparatus 10B having a single mold base 20B which supports a plurality of groupings 30.

FIGS. 17-21 show that single mold base 20B supports eight groupings 30 of three shape-forming configuration pairs 32 for simultaneously forming eight of each of lens regions 111, 112 and 113. Therefore, each injection shot simultaneously forms a region for each of twenty-four lenses 11.

Figure 19:
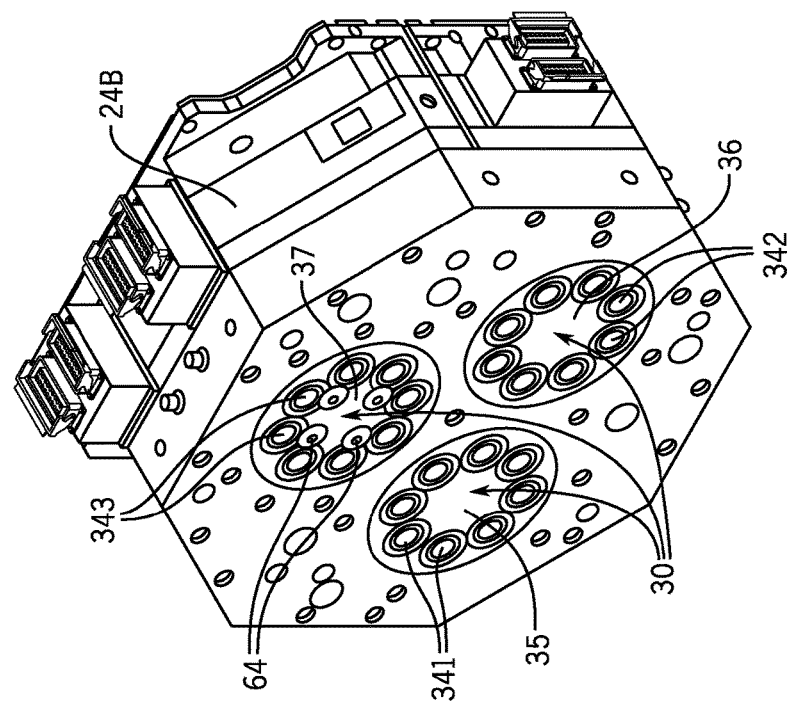
FIG. 19 is a perspective view of the stationary part of the single mold base of FIG. 16, showing the movable part supporting twenty-four cavities, each group of eight cavities being shaped corresponding to one of three groupings of shape-forming configurations.
Figure 18:
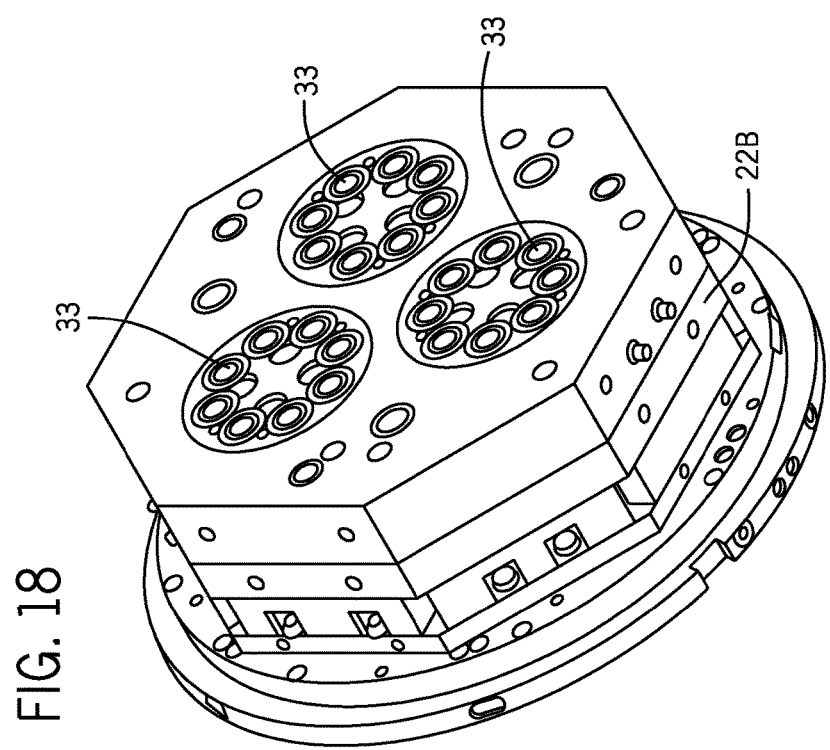
FIG. 18 is a perspective view of the movable part of the single mold base of FIG. 16, showing the movable part supporting twenty-four identical cavities, eight cavities for each of three groupings of shape-forming configurations.
Figure 23:
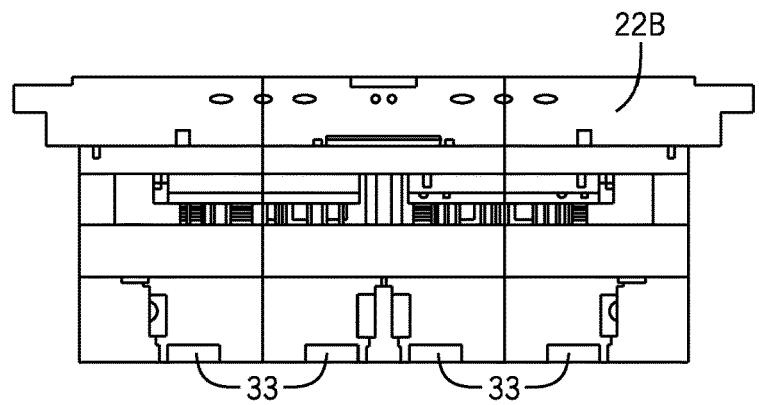
FIG. 23 is a cross-sectional view of the movable part of FIG. 18 taken along lines 23-23 seen in FIG. 22.
Figure 24:
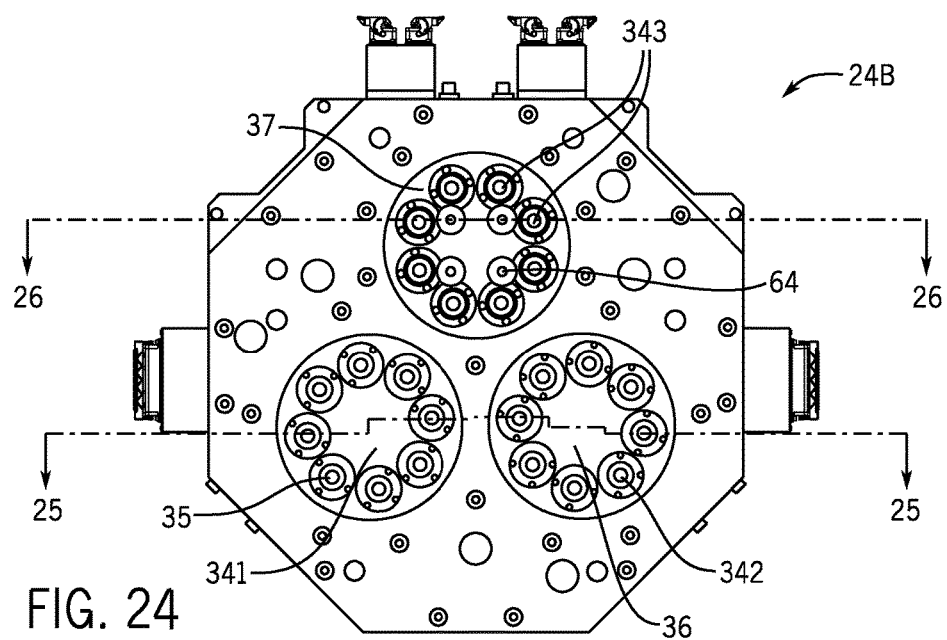
FIG. 24 a plan view of the stationary part of FIG. 19, shown from the side of the cavities.

FIGS. 18, 20 and 22 show that movable part 22B supports twenty-four identical cavities 33. It is seen in FIGS. 19, 21 and 24 that stationary part 24B supports three groups 35, 36 and 37 of shape-forming configurations 34. Group 35 includes eight cavities 341 shaped for molding first-formed lens region 111. Group 36 includes eight cavities 342 shaped for molding intermediate-formed lens region 112. Group 37 includes eight cavities 343 shaped for molding first-formed lens region 113.

Figure 38:
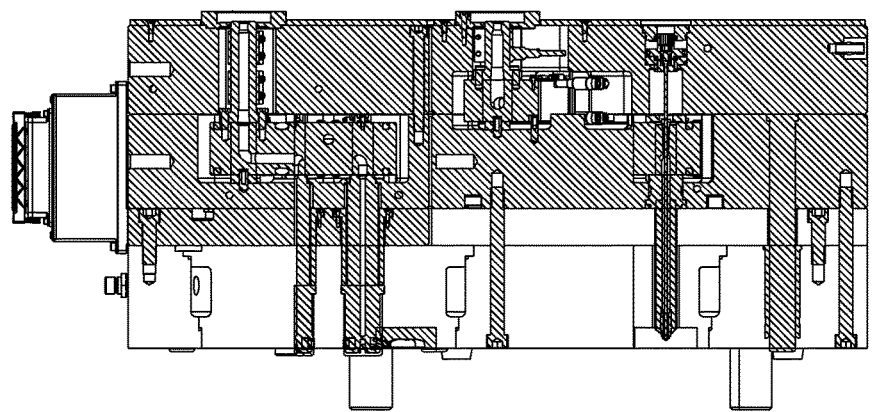
FIG. 38 is a cross-sectional view of the stationary part of FIG. 37 taken along lines 38-38.
Figure 37:
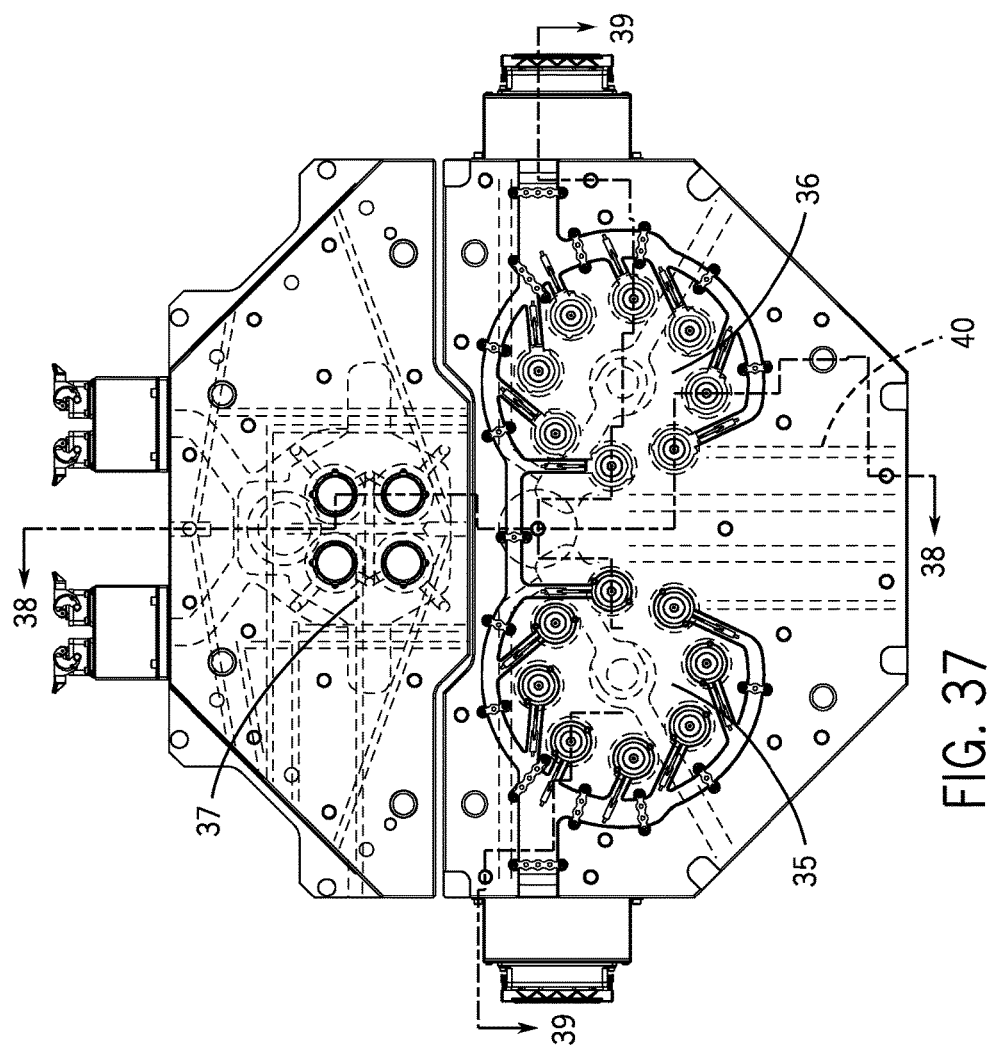
FIG. 37 is another plan view of the stationary part of FIG. 27, but illustrating connections and valve-gating for the nozzles.
Figure 39:
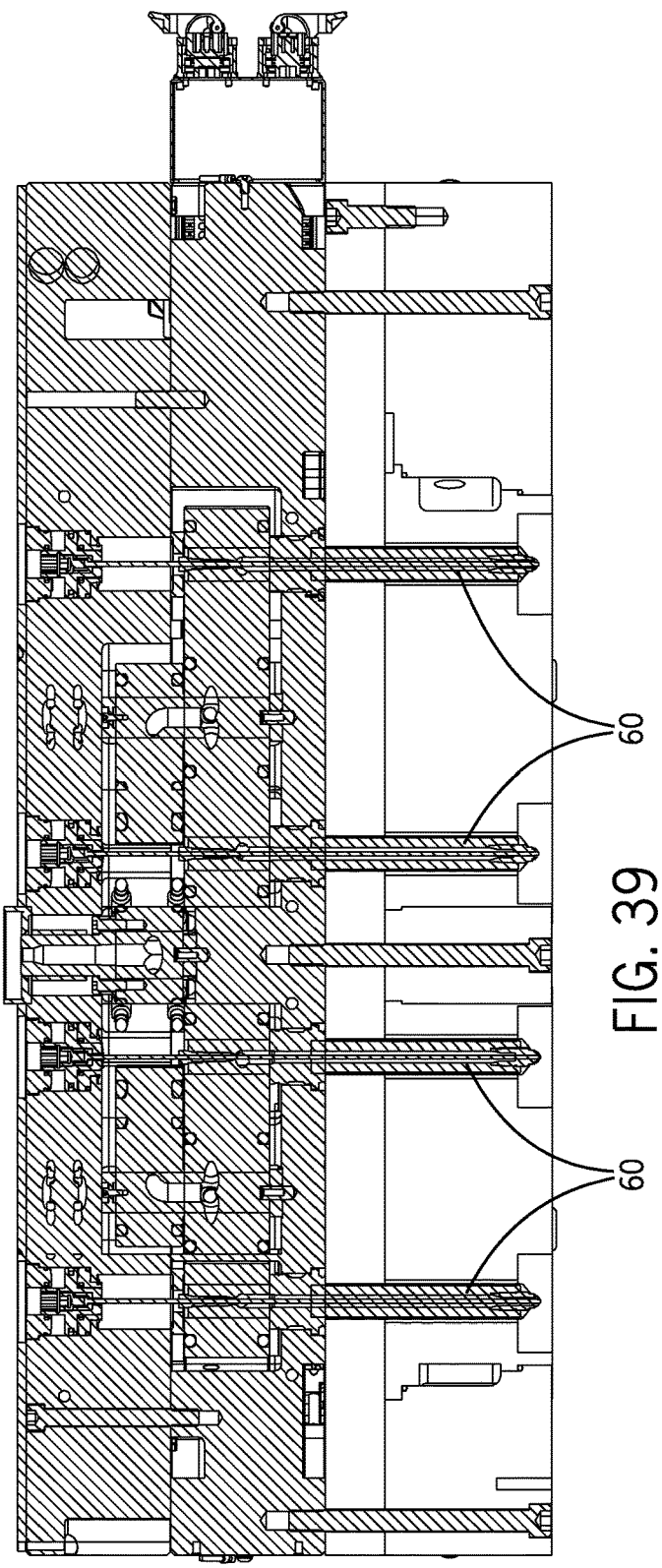
FIG. 39 is a cross-sectional view of the stationary part of FIG. 37 taken along lines 39-39.

The even number of groupings 30 facilitates balancing each injection-molding shot for equal filling of cavities 33 to form a consistently-shaped common article regions. Such balancing may be achieved via a valve-gate system 40 operatively connected to single mold base 20, as illustrated in FIGS. 37-39.

Figure 40:
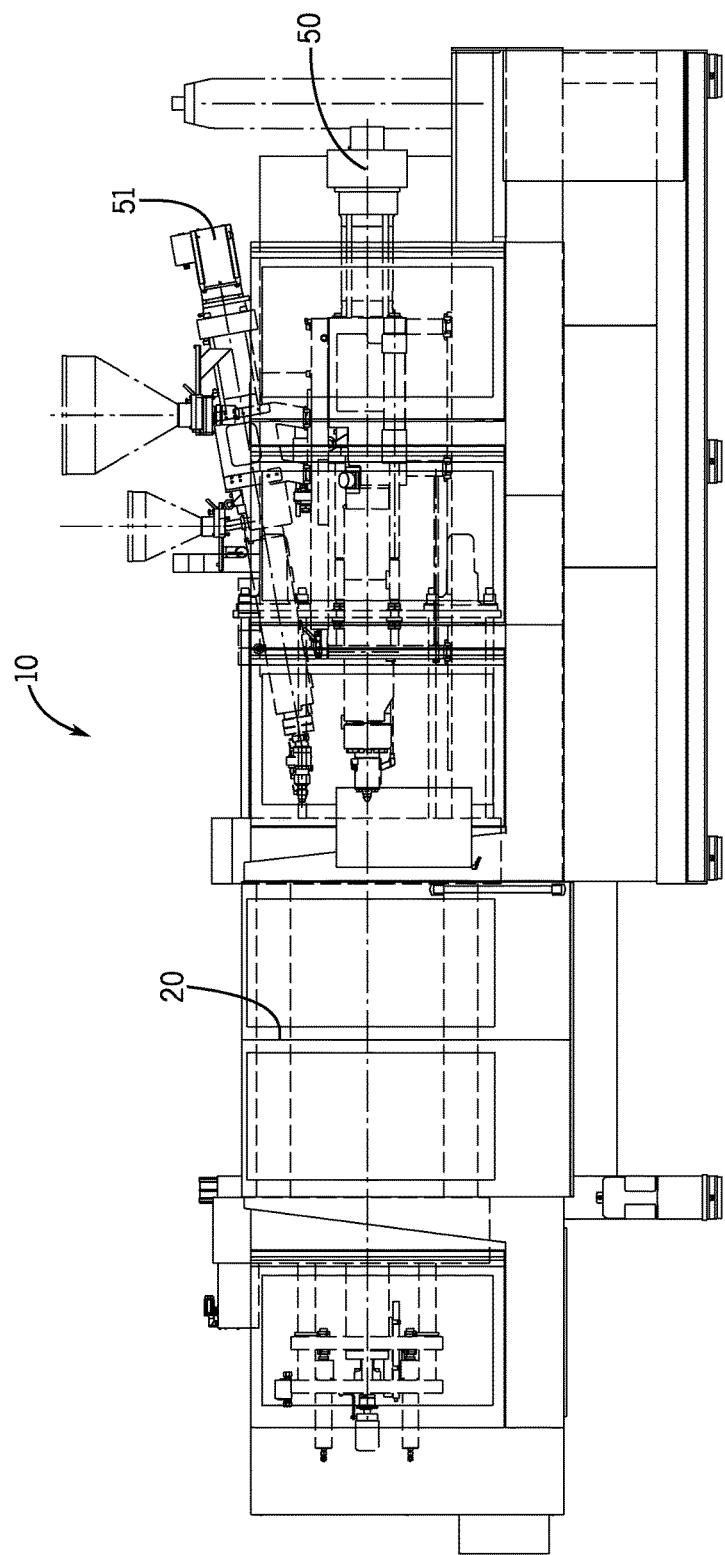
FIG. 40 is a side view of one example of an injection-molding apparatus according to the present invention.
Figure 42:
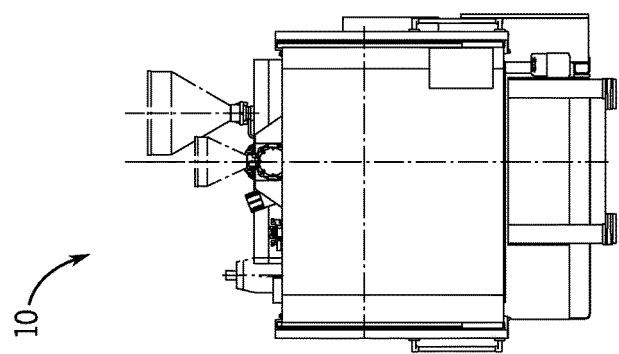
FIG. 42 is an end view of the injection-molding apparatus of FIG. 40.
Figure 41:
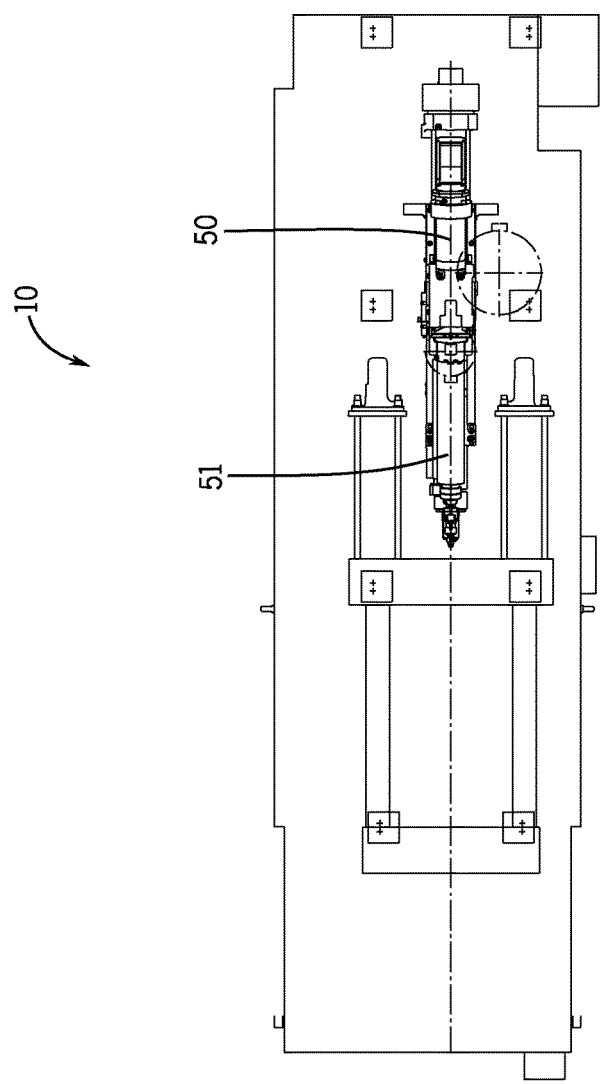
FIG. 41 is a top view of the injection-molding apparatus of FIG. 40.
Figure 43:
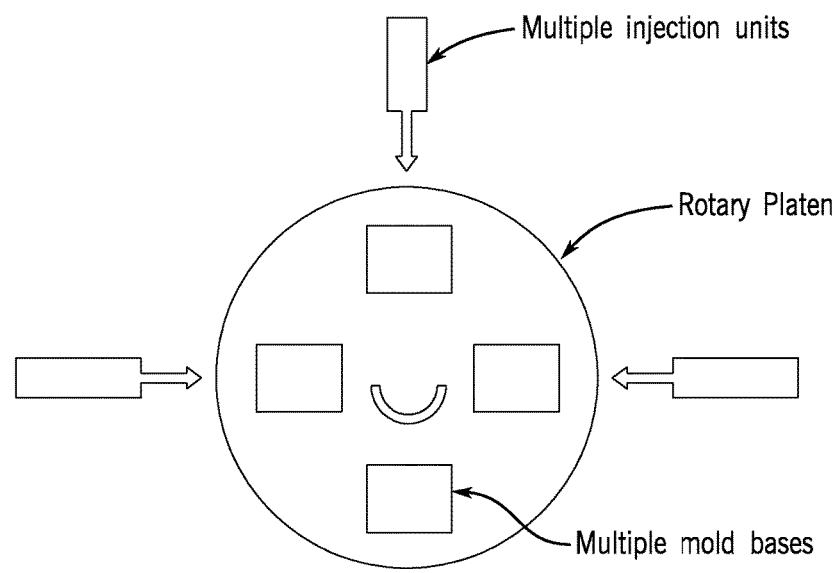
FIG. 43 is a schematic illustration of a prior multiple injection-molding unit.
Figure 44:
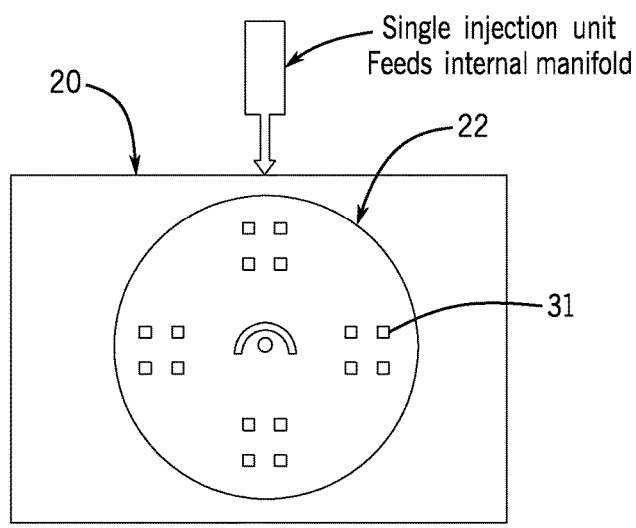
FIG. 44 is a schematic illustration of the injection-molding apparatus according to the present invention.

FIG. 40 shows injection-molding apparatus 10 having a pair of barrels 50 and 51 operatively connected to single mold base 20 for delivering a suitable thermoplastic material in each of injection-molding shots.

Figure 16:
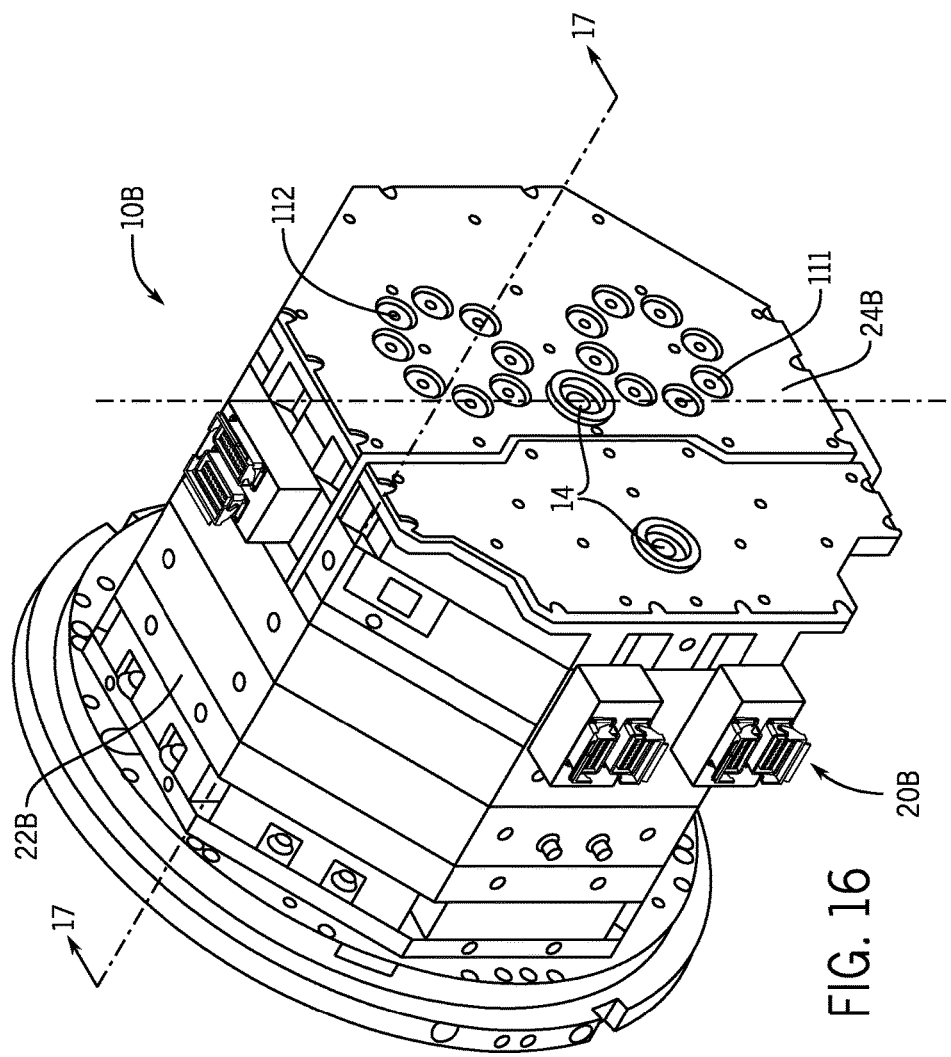
FIG. 16 is a perspective view from the stationary-part side of a single mold base according to another embodiment of the present invention, shown with movable and stationary parts in contact with each other such that each pair of the shape-forming configurations is in position for receiving an injection-molding shot of a polymeric material.
Figure 17:
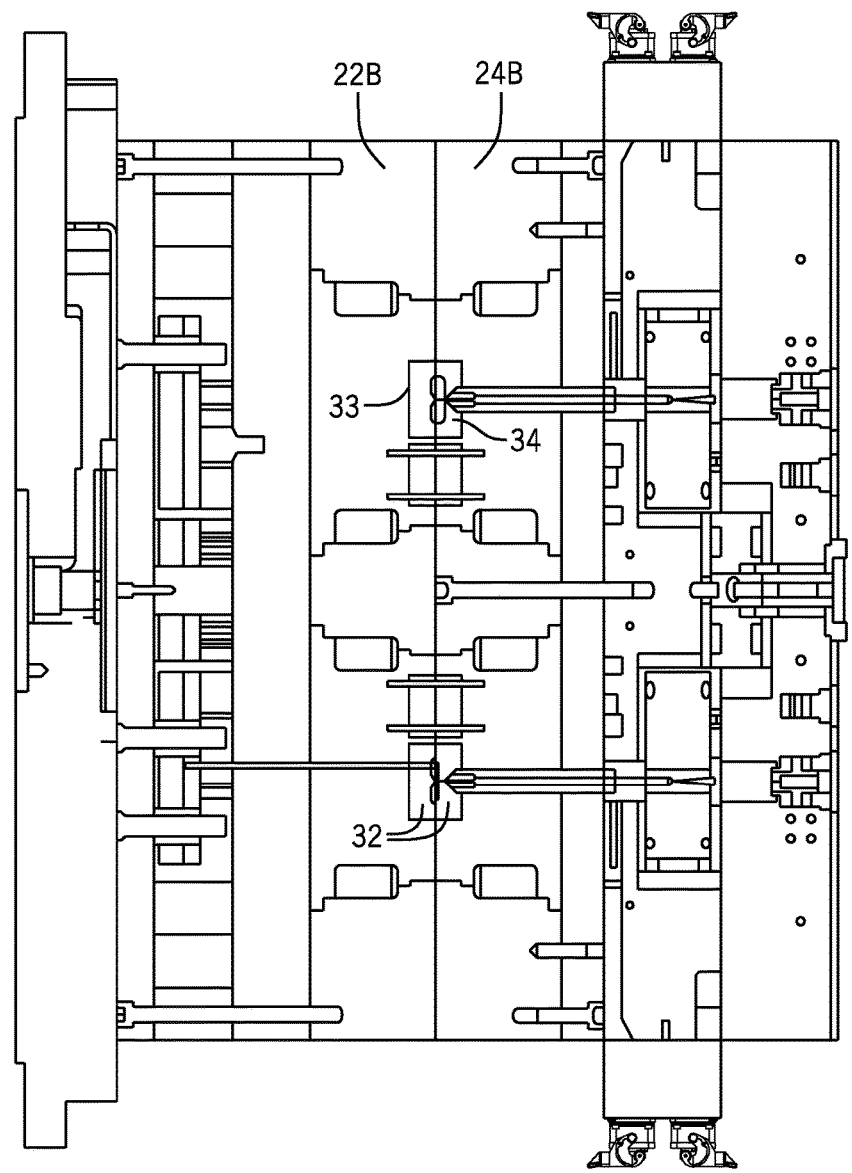
FIG. 17 is a cross-sectional view of the single mold base of FIG. 16 taken along a vertical axial plane 17-17.
Figure 35:
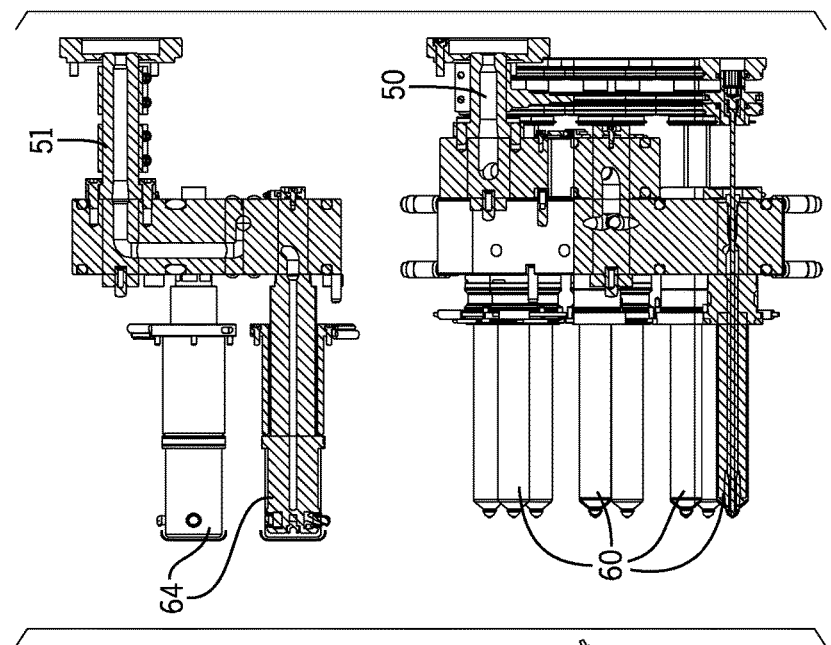
FIG. 35 is a right-side view of the nozzle arrangement of FIG. 33.
Figure 34:
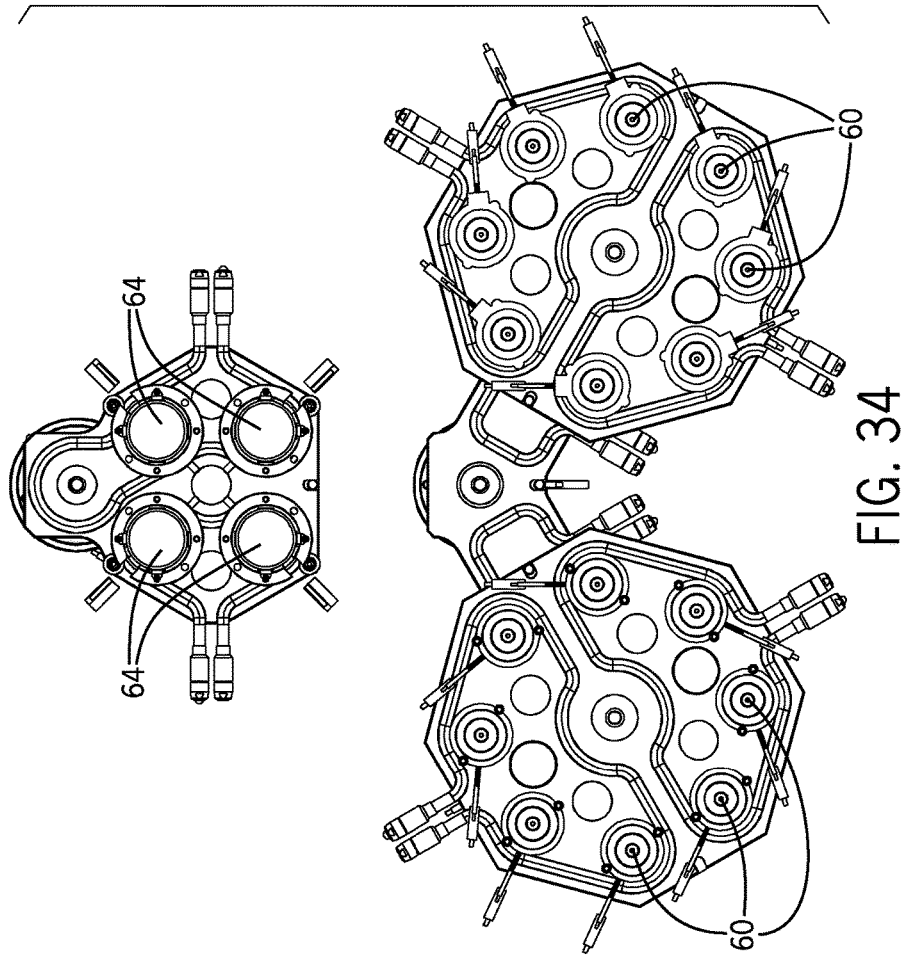
FIG. 34 is a plan view of the nozzle arrangement of FIG. 33.

It is seen in FIG. 16 that injection-molding apparatus 10B has a pair of openings 14. Each opening 14 is for connection to a corresponding one of two barrels 50 and 51. It is also seen in FIGS. 16 and 35 that barrel 51 is operatively connected to the shape-forming configuration set 32 for forming last-formed article region 113. Barrel 50 is operatively connected to shape-forming configuration sets for forming first-formed and intermediate-formed article regions 111 and 112.

FIG. 16 also shows movable part 22B in contact with the stationary part 24B during each of the injection-molding shots such that cavities 33 and 34 of each pair are in alignment. Between the injection-molding shots, single mold base 20 is opened for ejection of finished articles and movable part 22B rotates about axis 21 to advance positions of cavities 33 for molding first-formed lens region 111 in the empty cavity 33 and for over-molding first-formed and intermediate-formed lens regions 111 and 112 with the subsequent intermediate-formed and last-formed lens regions 112 and 113, respectively.

Barrel 51 for last-formed article region 113 delivers the corresponding injection-molding shot at a higher pressure than the injection-molding shots delivered by barrel 50. This compensates for shrinkage of plastic material that occurs upon cooling. Such increased pressure coupled with reduced processing time due to subsequent injection shots(s) being delivered prior to complete cooling of prior-formed article regions facilitates overall reduction of stress of thermoplastic material during the molding process of forming the article.

FIGS. 27-36 show that injection-molding apparatus 10B includes two groups 61 and 62 of eight nozzles 60 in each group 61 and 62. Each of nozzles 60 is for delivering the thermoplastic material to one of sixteen shape-forming configuration pairs 32 in a corresponding injection-molding shot for forming one of first-formed article region 111 and intermediate-formed article regions 112.

Figure 25A:
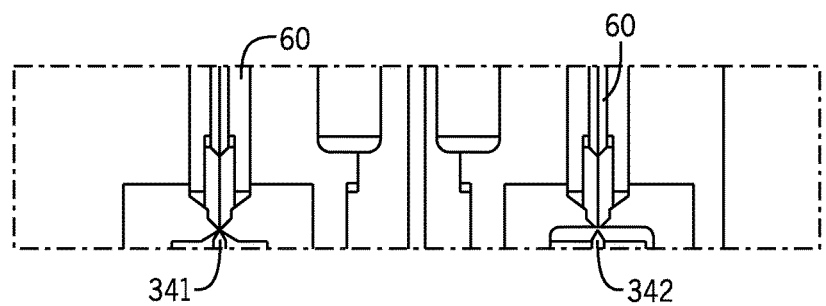
FIG. 25A is an enlarged view of a fragment of FIG. 25.
Figure 27:
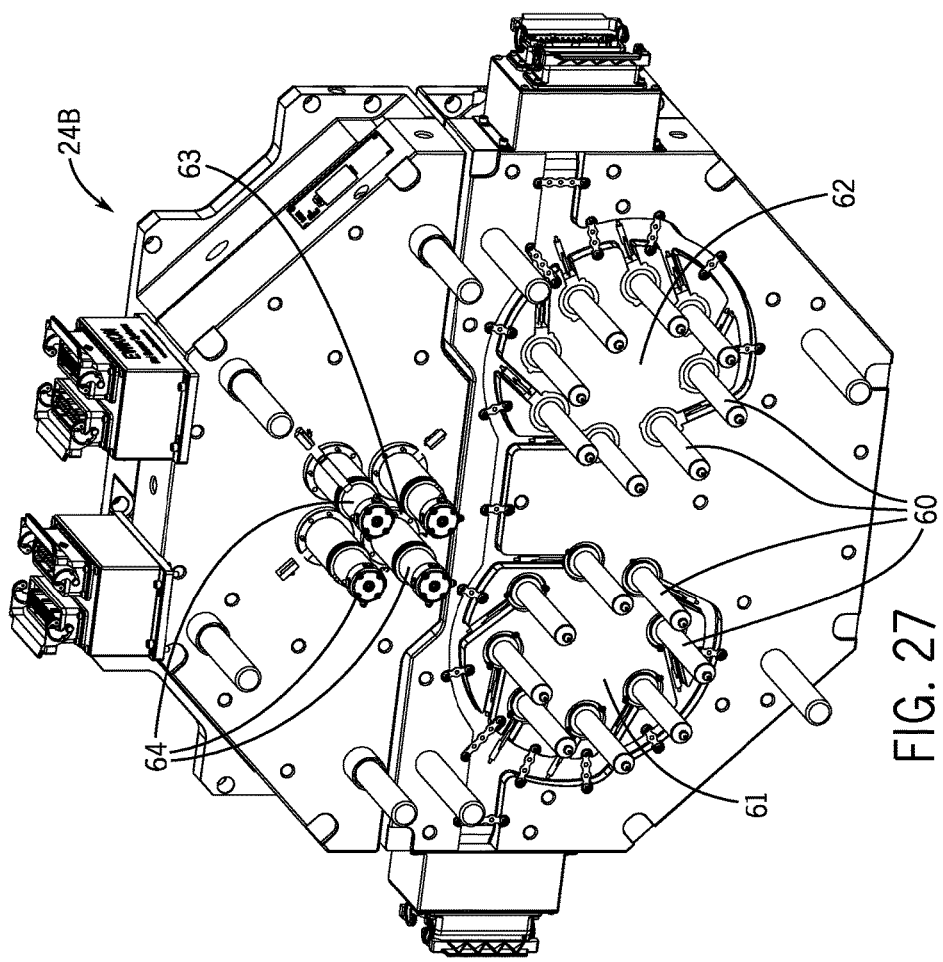
FIG. 27 is a perspective view of a portion of the stationary part of FIG. 19 showing an arrangement of nozzles.
Figure 28:
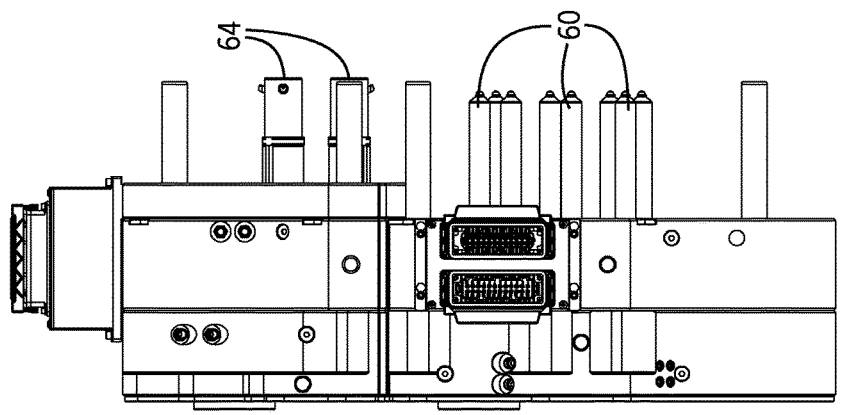
FIG. 28 is a left-side elevation of the nozzle portion of the stationary part of FIG. 27.
Figure 30:
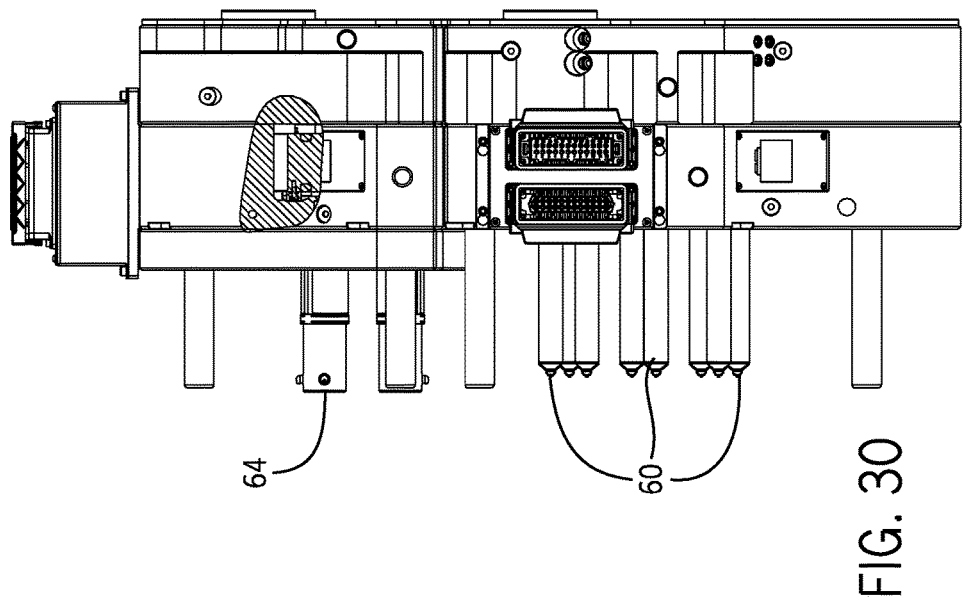
FIG. 30 is a right-side elevation of the nozzle portion of the stationary part of FIG. 27.
Figure 29:
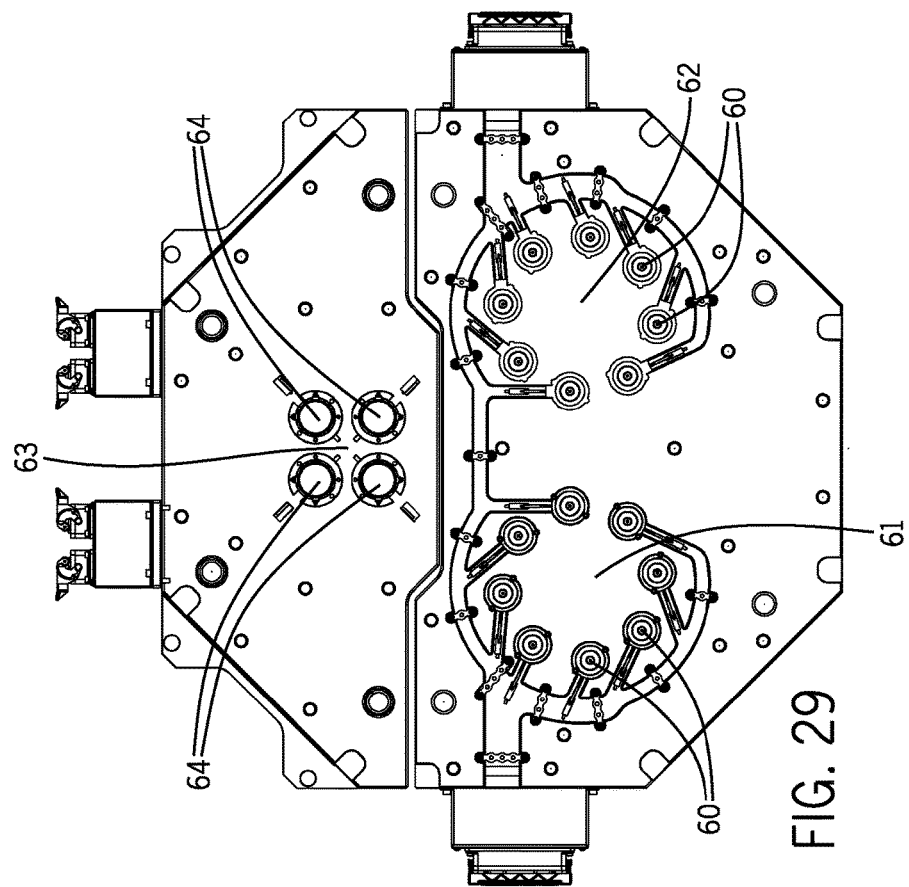
FIG. 29 is a plan view of the nozzle portion of the stationary part of FIG. 27.
Figure 33:
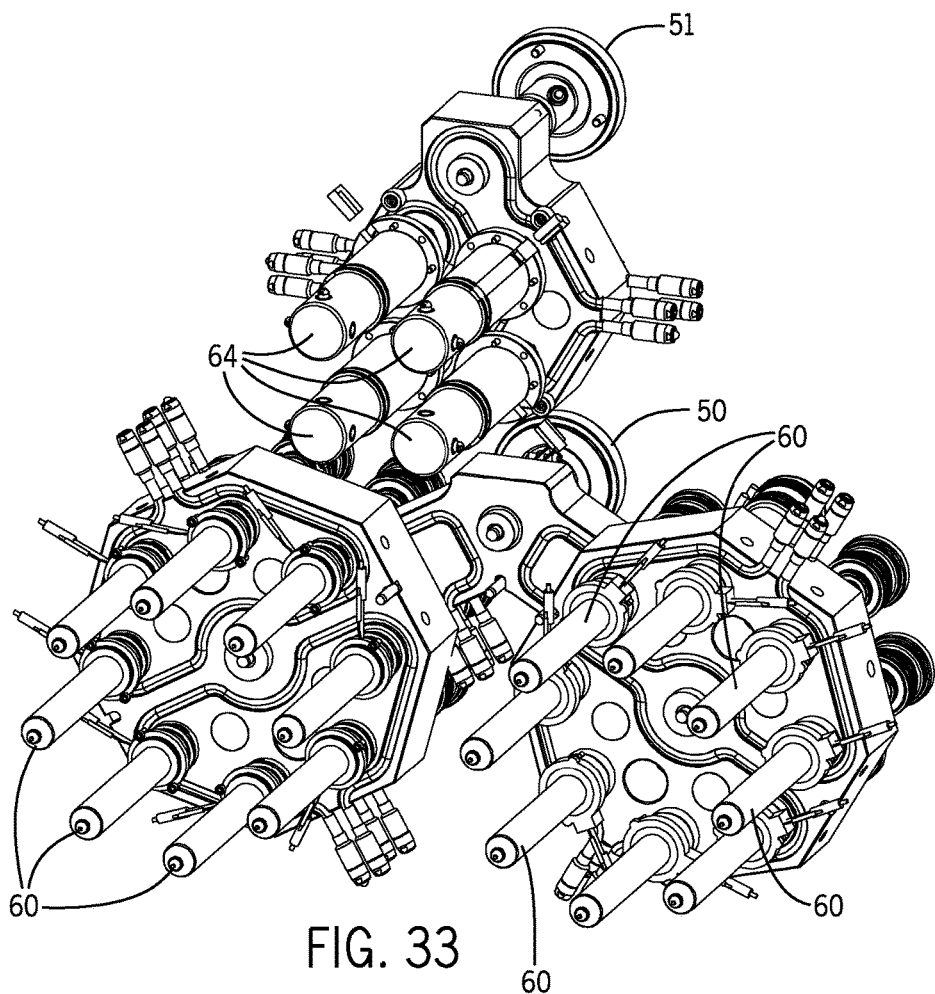
FIG. 33 is a perspective view of the nozzle arrangement of FIG. 27.
Figure 36A:
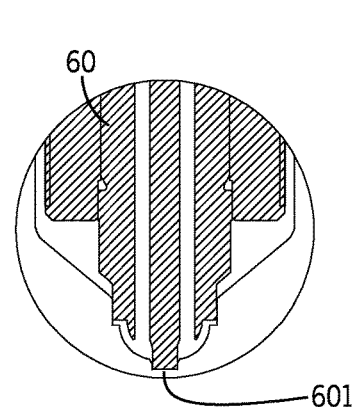
Figure 36B:
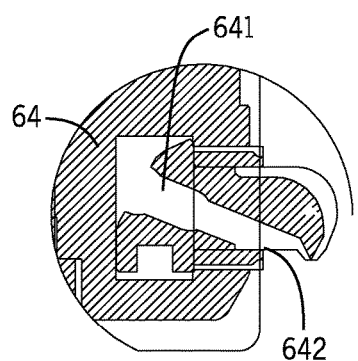

It is seen in FIGS. 33-36, 36A and 36C that each of nozzles 60 is positioned and has a gate 601 configured for delivering the thermoplastic material in the corresponding injection-molding shot at a position 611 in first-formed lens region 111 and at a position 621 in intermediate-formed lens region 112, as seen in FIGS. 3 and 8. It is also seen in FIGS. 8 and 25A that gate positions 611 and 621 are over-molded with the respective subsequently-formed article regions 112 and 113.

It is also seen in FIGS. 27-36 that injection-molding apparatus 10B also includes a group 63 of four nozzles 64. Each nozzle 64 is for delivering the thermoplastic material to two of eight shape-forming configuration pairs 32 in a corresponding injection-molding shot for forming last-formed article regions 113.

Figure 26:
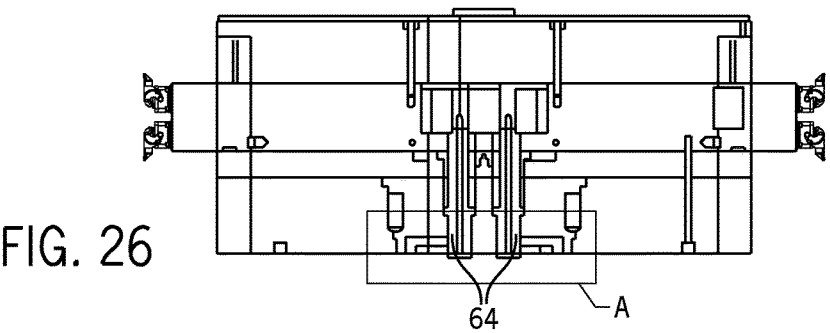
FIG. 26 is a cross-sectional view of the stationary part of FIG. 24 taken along lines 26-26.
Figure 25:
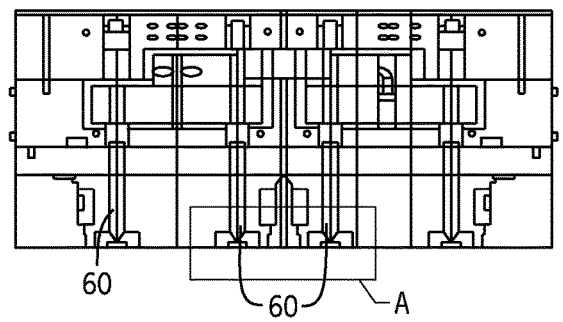
FIG. 25 is a cross-sectional view of the stationary part of FIG. 24 taken along lines 25-25.
Figure 26A:
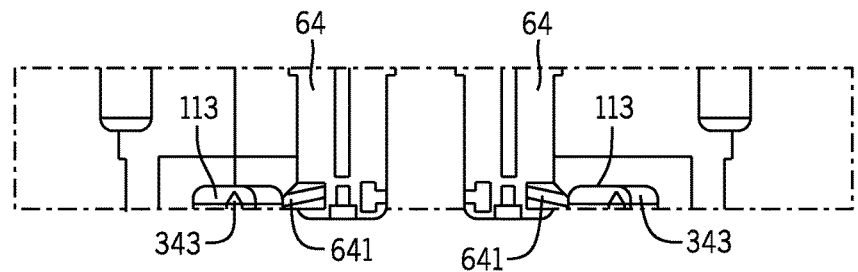
FIG. 26A is an enlarged view of a fragment of FIG. 26.

FIGS. 3, 26 and 26A best show that nozzles 64 are positioned for delivering the thermoplastic material at a lateral edge 131 of lens flange portion 13. This facilitates automatic degating of the finished product upon ejection. It is seen in FIGS. 33-36 and 36B that each nozzle 64 has an angular tunnel gate 641 for delivering the thermoplastic material for the last injection-molding shot at an angle between vertical and horizontal.

Because during the molding process the components remain on the movable core half, there is no need for shot-to-shot degating as the article is built through hot drops from the manifold system. In some embodiments, the final shot can be internally degated upon mold opening.

While the principles of the invention have been shown and described in connection with specific embodiments, it is to be understood that such embodiments are by way of example and are not limiting.

The invention claimed is:

1. An injection-molding apparatus comprising a single mold base supporting at least one grouping of shape-forming configuration sets, each set being shaped for forming one layer of a multilayered article comprising an asymmetric surface with two radial sides, one of the shape-forming configuration sets having a shape of one of the radial sides, at least one other shape-forming configuration set having a shape of the other radial side, the formed article layers being retained in the single mold base at least until completion of the last-formed layer of the article.

2. The injection-molding apparatus of claim 1 wherein:
each shape-forming configuration set includes at least one cavity, the formed article layers being retained within the cavity; and
the single mold base comprises an internal movable part which moves within the single mold base with respect to a stationary part such that relative positions of the shape-forming configurations are advanced for each set to form a subsequent article layer in each of the cavities.

3. The injection-molding apparatus of claim 2 wherein:
the single mold base defines an axis;
the movable part supports the cavities and is rotatable about the axis to form subsequent article layers in each cavity.

4. The injection-molding apparatus of claim 2 wherein all of the cavities supported by the movable part are identical.

5. The injection-molding apparatus of claim 1 comprising at least three shape-forming configuration sets.

6. The injection-molding apparatus of claim 1 wherein each shape-forming configuration set is a pair of shape-forming configurations.

7. The injection-molding apparatus of claim 6 wherein one of the shape-forming configurations of each pair is a cavity supported by a stationary part of the single mold base and retaining formed article layers.

8. The injection-molding apparatus of claim 1 wherein each of the formed layers of the article includes at least a portion of one of final surfaces of the article.

9. The injection-molding apparatus of claim 1 being configured such that each subsequent shot is prior to full cooling of the article region formed in the previous shot.

10. The injection-molding apparatus of claim 1 further comprising barrels configured for delivering injection-molding shots to the single mold base, one of the barrels being configured and positioned for delivering thermoplastic material for forming the last-formed article layer, the other of the barrels being configured and positioned for forming article layers prior to the last-formed.

11. The injection-molding apparatus of claim 10 wherein the barrel for the last-formed article layer configured for delivery of thermoplastic material for the corresponding injection-molding shot at a higher pressure than the injection-molding shots delivered by the other barrels.

12. The injection-molding apparatus of claim 1 further comprising at least one grouping of nozzles each corresponding to a particular one of shape-forming configurations, one nozzle of the at least one grouping corresponding to the shape-forming configuration for forming the last-formed article layer and being positioned for delivering the corresponding injection-molding shot at a lateral edge of the finished article.

13. The injection-molding apparatus of claim 12 wherein the other of the nozzles corresponds to shape-forming configurations for forming first-formed and at least one intermediate-formed article layers, each of these nozzles being positioned for delivering thermoplastic material to such position which is over-molded with at least one of the subsequently-formed article layers.

14. The injection-molding apparatus of claim 1 wherein:
the single mold base comprises a stationary part and a movable part which moves internally within the single mold base with respect to the stationary part;
one of the movable and stationary parts supports identical shape-forming configurations of each set; and the other of the movable and stationary parts supports shape-forming configurations each shaped for one of the article layers.

15. The injection-molding apparatus of claim 14 wherein each shape-forming configuration set is a pair of cavities.

16. The injection-molding apparatus of claim 1 wherein the article is a lens member for transmitting LED light therethrough, the lens member comprising a lens portion and a flange thereabout, the lens portion having the asymmetric surface which is one of inner and outer surfaces.

17. The injection-molding apparatus of claim 16 wherein the shape of each shape-forming configuration set includes at least a portion of one of the inner and outer surfaces of the lens member.

18. The injection-molding apparatus of claim 16 wherein the shape of the shape-forming configuration set for the last injection-molding shot includes the shape of the flange of the lens member for engagement by an ejection system.

19. The injection-molding apparatus of claim 1 wherein the single mold base supports a plurality of the groupings for simultaneous formation of first-formed, at least one of the intermediate-formed and last-formed article layers each for one of a plurality of the articles.

20. The injection-molding apparatus of claim 19 wherein each set includes at least one cavity retaining each article layer formed by at least one preceding injection-molding shot.

21. The injection-molding apparatus of claim 20 further comprising a valve-gate system for balancing each injection-molding shot for equal filling of the cavities, the plurality of the groupings being an even number of the groupings.

22. The injection-molding apparatus of claim 19 wherein the plurality of the groupings comprises eight of the grouping of at least three shape-forming configuration pairs for simultaneously forming eight of each of at least three article layers, thereby simultaneously forming one of the layers for each of at least twenty-four articles.

23. The injection-molding apparatus of claim 19 wherein each of the articles is a lens member for transmitting LED light therethrough, each lens member comprising a lens portion and a flange thereabout, the lens portion having inner and outer surfaces.

24. A method for article formation, the method comprising the steps of:
providing an injection-molding apparatus comprising a single mold base supporting at least one grouping of a plurality of shape-forming configuration sets, each being shaped according to one layer of a multilayered article comprising an asymmetric surface with two radial sides, one of the shape-forming configuration sets having a shape of one of the radial sides, at least one other shape-forming configuration set having a shape of the other radial side;
forming a first-formed region of the article by delivering an injection-molding shot to the respective shape-forming configuration set;
advancing a movable part of the single mold base such that the shape-forming configuration, which retains the first-formed article region, is paired with the shape-forming configuration shaped for the subsequent intermediate-formed region of the article;
delivering an injection-molding shot which forms the intermediate-formed article region at least partially over-molding the article region formed in the preceding injection-molding shot;
further advancing the movable part within the single base such that the shape-forming configuration, which retains the first-formed and the at least one intermediate-formed article region, is paired with the shape-forming configuration corresponding to a subsequent one of the article regions; and
at least partially over-molding the at least one formed intermediate-formed article region with the subsequent one of the article regions by delivering a subsequent injection-molding shot.

25. The method of claim 24 wherein each injection-molding shot is delivered to a corresponding shape-forming configuration pair prior to full cooling of the article region formed in a preceding injection-molding shot.

26. The method of claim 24 wherein the subsequent one of the article regions includes a last-formed article region.

27. The method of claim 24 wherein:
the injection-molding apparatus further comprises at least one grouping of nozzles, each nozzle for delivering an injection-molding shot forming one of the first-formed region, at least one intermediate-formed region and the last-formed region of the article;
the nozzles for forming first-formed and at least one intermediate-formed article regions are each positioned for delivering a corresponding injection-molding shot at a position which is over-molded with at least one of the subsequently-formed article regions; and
the nozzle for forming the last-formed article region is positioned for delivering the corresponding injection-molding shot at a lateral edge of the finished article.

28. The method of claim 24 wherein the step of forming a first-formed region of the article, the step of delivering a subsequent injection-molding shot and the step of at least partially over-molding the at least one intermediate-formed article region are performed simultaneously.

29. The method of claim 28 wherein each injection-molding shot for over-molding at least one formed article region is delivered prior to full cooling of the article region formed in the preceding injection-molding shot.

* * * * *

UNITED STATES PATENT AND TRADEMARK OFFICE
CERTIFICATE OF CORRECTION

PATENT NO.          : 10,207,440 B2
APPLICATION NO.     : 14/508915
DATED               : February 19, 2019
INVENTOR(S)         : Raleigh et al.

It is certified that error appears in the above-identified patent and that said Letters Patent is hereby corrected as shown below:

In the Specification

At Column 2, Line 19, delete "embodiment" and insert --embodiments--.
At Column 6, Line 25, after the words "Fig. 24", insert --is--.

In the Claims

At Column 10, Line 43, in Claim 11, after the word "layer", insert --is--.

Signed and Sealed this
Fourteenth Day of May, 2019

Andrei Iancu
*Director of the United States Patent and Trademark Office*